United States Patent
Kazmi et al.

(10) Patent No.: US 9,094,845 B2
(45) Date of Patent: Jul. 28, 2015

(54) METHODS AND ARRANGEMENTS IN A WIRELESS COMMUNICATION SYSTEM

(71) Applicants: Muhammad Ali Kazmi, Bromma (SE); Torbjörn Elfström, Fjärås (SE)

(72) Inventors: Muhammad Ali Kazmi, Bromma (SE); Torbjörn Elfström, Fjärås (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 241 days.

(21) Appl. No.: 13/702,719

(22) PCT Filed: Sep. 28, 2012

(86) PCT No.: PCT/SE2012/051044
§ 371 (c)(1),
(2) Date: Dec. 7, 2012

(87) PCT Pub. No.: WO2013/051993
PCT Pub. Date: Apr. 11, 2013

(65) Prior Publication Data
US 2014/0078973 A1   Mar. 20, 2014

Related U.S. Application Data

(60) Provisional application No. 61/544,377, filed on Oct. 7, 2011.

(51) Int. Cl.
*H04W 24/02* (2009.01)
*H04W 8/22* (2009.01)
*H04W 24/00* (2009.01)

(52) U.S. Cl.
CPC ............... *H04W 24/02* (2013.01); *H04W 8/22* (2013.01); *H04W 24/00* (2013.01)

(58) Field of Classification Search
CPC ........ H04W 24/02; H04W 8/22; H04W 24/00
USPC ......................................... 370/329, 331, 332
See application file for complete search history.

(56) References Cited

U.S. PATENT DOCUMENTS

| | | | |
|---|---|---|---|
| 2003/0064729 A1* | 4/2003 | Yamashita | .................... 455/451 |
| 2006/0089104 A1* | 4/2006 | Kaikkonen et al. | ......... 455/67.13 |
| 2008/0001732 A1 | 1/2008 | Ober | |
| 2009/0124250 A1 | 5/2009 | Topaltzas et al. | |

(Continued)

OTHER PUBLICATIONS

3rd Generation Partnership Project, "Universal Mobile Telecommunications System (UMTS); Measurements of radio performances for UMTS terminals in speech mode (3GPP TR.914 version 10.1.0 Release 10)", Technical Report, Jul. 1, 2011, vol. 3GPP Ran 4, No. V10.1.0, XP 14065648, ETSI, France.

(Continued)

*Primary Examiner* — Mohammad Anwar
(74) *Attorney, Agent, or Firm* — Coats & Bennett, PLLC

(57) ABSTRACT

Some embodiments provide a method executed in a network node comprised in a wireless communications network. According to the method, the network node obtains (120) information related to the form factor of a wireless device comprised in the wireless communications network. Based on the obtained information, the network node determines (1110) radio resources and/or appropriate physical layer parameters and/or configuration parameters for the wireless device. The determined radio resources and/or parameters are then used (1120) for a network operation.

15 Claims, 10 Drawing Sheets

(56) References Cited

U.S. PATENT DOCUMENTS

2009/0163208 A1* 6/2009 Rao ............................... 455/436
2011/0103339 A1* 5/2011 Kim et al. ..................... 370/329

OTHER PUBLICATIONS

3rd Generation Partnership Project, "3rd Generation Partnership Project; Technical Specification Group Radio Access Network; Base Station (BS) radio transmission and reception (FDD) (Release 9)", Technical Specification, 3GPP TS 25.104 V9.7.0, Jun. 1, 2011, pp. 1-88, 3GPP, France.

3rd Generation Partnership Project, "3rd Generation Partnership Project; Technical Specification Group Radio Access Network; Evolved Universal Terrestrial Radio Access (E-UTRA); Base Station (BS) radio transmission and reception (Release 10)", Technical Specification, 3GPP TS 36.104 V10.4.0, pp. 1-112, Sep. 1, 2011, 3GPP, France.

3rd Generation Partnership Project, "3rd Generation Partnership Project; Technical Specification Group Radio Access Network; Evolved Universal Terrestrial Radio Access (E-UTRA); User Equipment (UE) radio transmission and reception (Release 8)", Technical Specification, 3GPP TS 36.101 V8.15.0, Sep. 1, 2011, pp. 1-170, 3GPP, France.

3rd Generation Partnership Project, "3rd Generation Partnership Project; Technical Specification Group Radio Access Network; Evolved Universal Terrestrial Radio Access (E-UTRA); Requirements for support of radio resource management (Release 9)", Technical Specification, 3GPP TS 36.133 V9.9.0, Sep. 1, 2011, pp. 1-427, 3GPP, France.

3rd Generation Partnership Project, "3rd Generation Partnership Project; Technical Specification Group Radio Access Network; Requirements for support of radio resource management (FDD) (Release 9)", Technical Specification, 3GPP TS 25.133 V9.9.0, Sep. 1, 2011, 3GPP, France.

3rd Generation Partnership Project, "3rd Generation Partnership Project; Technical Specification Group Radio Access Network; User Equipment (UE) radio transmission and reception (FDD) (Release 9)", 3GPP TS 25.101 V9.8.0, Sep. 1, 2011, pp. 1-246, 3GPP, France.

Nokia Corporation, "New SID proposal: Introduction of Hand phantoms for UE OTA antenna testing", 3GPP TSG RAN Meeting #53, Fukuoka, Japan, Sep. 13, 2011, pp. 1-5, RP-111118, 3GPP.

\* cited by examiner

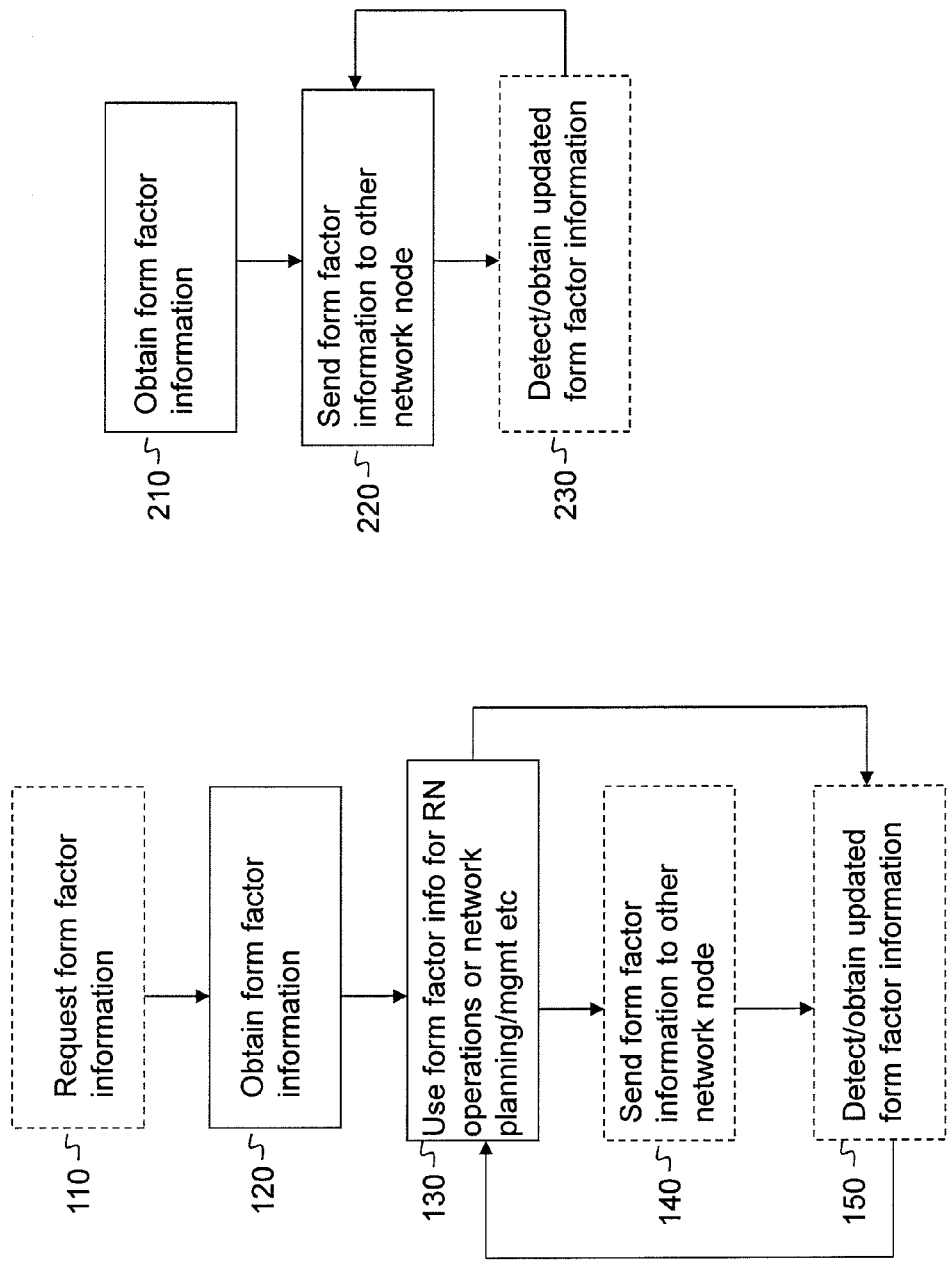

METHODS AND ARRANGEMENTS IN A WIRELESS COMMUNICATION SYSTEM

TECHNICAL FIELD

The invention relates to a method in a wireless device for providing form factor information, to methods in a network node for providing form factor information and for using form factor information in radio network operations, and to wireless devices and network nodes implementing these methods.

BACKGROUND

The 3rd Generation Partnership Project (3GPP) is responsible for the standardization of the Universal Mobile Telecommunication System (UMTS) and Long Term Evolution (LTE). The 3GPP work on LTE is also referred to as Evolved Universal Terrestrial Access Network (E-UTRAN). LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 Hz when carrier aggregation is employed.

In a multi-carrier or carrier aggregation system, each carrier is generally called a component carrier (CC). A component carrier is sometimes also referred to as a cell. The term "component carrier" (CC) refers to an individual carrier in a multi-carrier system. Carrier aggregation (CA) is also referred to as "multi-carrier system", "multi-cell operation", "multi-carrier operation", or "multi-carrier" transmission and/or reception. This means that CA is used for transmission of signaling and data in the uplink and downlink directions. One of the CCs is the primary carrier or anchor carrier and the remaining ones are called secondary or supplementary carriers. Generally, the primary or anchor CC carries the essential UE specific signaling. The primary CC exists in both the uplink and downlink directions. The network may assign different primary carriers to different user equipments (UEs) operating in the same sector or cell. In carrier aggregation, the UE may have more than one serving cell: one primary serving cell and one or more secondary serving cell. The serving cell may interchangeably be called the primary cell (PCell) or primary serving cell (PSC). Similarly, the secondary serving cell is interchangeably called the secondary cell (SCell) or secondary serving cell (SSC). Regardless of the terminology, the PCell and SCell(s) enable the UE to receive and transmit data. More specifically, the PCell and SCell exist in DL and UL for the reception and transmission of data by the UE. The remaining non-serving cells are called neighbor cells.

The CCs in CA may or may not be co-located in the same site or base station. For instance the CCs may originate (i.e. be transmitted/received) at different locations, e.g. from non-colocated base stations, or from a BS and remote radio heads (RRH) or remote radio units (RRU). Some well known examples of combined CA and multi-point communication are DAS, RRH, RRU, CoMP, multi-point transmission/reception etc. The embodiments disclosed herein also apply to the multi-point carrier aggregation systems.

A minimization of drive test (MDT) feature has been introduced in LTE and HSPA release 10. The MDT feature provides means for reducing the effort for operators when gathering information for the purpose of network planning and optimization. The MDT feature requires that the UEs log or obtain various types of measurements, events and coverage related information. The logged or collected measurements or relevant information are then sent to the network. The UE can collect the measurements during connected as well as in low activity states e.g. idle state in UTRA/E-UTRA, cell PCH states in UTRA etc. The UE can also be configured to report the CGI of the target cells along with other measurements (e.g. RSRP, RSRQ, CPICH measurements, radio link failure report, BCH failure rate, paging channel failure rate etc).

Several positioning methods exist for determining the location of the target device, which can be a UE, mobile relay, PDA etc. Some well known methods are:

Satellite based methods; these use A-GNSS (e.g. A-GPS) measurements for determining UE position Observed time difference of arrival (OTDOA): Uses UE RSTD measurements for determining UE position in LTE Uplink time difference of arrival (UTDOA): Uses measurements done at LMU for determining UE position Enhanced cell ID: Uses one or more of UE Rx-Tx time difference, BS Rx-Tx time difference, LTE RSRP/RSRQ, HSPA CPICH measurements, angle of arrival (AoA) etc for determining UE position.

Hybrid methods: Using measurements from more than one method for determining UE position.

In LTE, the positioning node (aka E-SMLC or location server) configures the UE, eNode B or LMU to perform one or more positioning measurements. The positioning measurements are used by the UE or positioning node to determine the UE location. The positioning node communicates with UE and eNode B in LTE using LPP and LPPa protocols.

Performance requirements are specified in order to ensure that a wireless device properly implements a particular feature. For instance, to guarantee that a user equipment (UE) supporting the Multiple Input-Multiple Output (MIMO) feature exhibits good performance in practice, the corresponding MIMO performance requirements are specified. The performance requirement is also verified by the virtue of conformance tests.

Performance requirements can be broadly divided into the following two main categories:

Conducted performance requirements

Radiated performance requirements

It is important to note that the term "performance requirement" as used in this disclosure is a generic term. In the literature, different terminologies are used to denote performance requirements specified for different types or aspects of features. For instance, some well known terms are core requirements, radio resource management (RRM) requirements, and demodulation requirements. These terms will also become apparent with specific examples. Nonetheless, the term "performance requirement" hereinafter covers any type of requirement without limiting it to the above mentioned examples.

Conducted performance requirements or, more briefly, "conducted requirements", are to be met by the wireless device at a well defined point or location on the wireless device. Such a point is commonly called as test point or test port or test location where the requirements should be met. Typically the conducted requirements are to be fulfilled at the antenna connector of the wireless device, i.e. the test point or location is the antenna connector. The test point may also be located e.g. between the baseband and radio part of the wireless device.

In order to verify the conducted requirements, tests are done by setting up a test system in a lab or in any controlled environment. In a test system the test point, e.g. antenna reference point or antenna connector, of the wireless device under test (DUT) is connected to the test equipment (TE) via a coaxial cable, i.e. a non-wireless connection. The TE is also commonly called system simulator (SS). The channel model, radio environment or other conditions required in the tests are realized by additional devices in the test system e.g. fader, signal generator, signal attenuator, signal amplifier etc.

Conducted performance requirements can be classified into the following three main groups:

Radio requirements

Baseband requirements

Radio resource management (RRM) requirements

Radio requirements are further classified into:

RF receiver requirements e.g. receiver sensitivity

RF transmitter requirements e.g. transmit power accuracy

Typically, baseband requirements refer to the performance obtained after demodulating the received signal. Baseband performance may for example be expressed in terms of the demodulation performance, which in turn may be expressed in terms of achievable throughput, e.g. usable bit rate, block error rate (BLER) etc.

Radio resource management (RRM) requirements are typically specified to guarantee mobility performance of the wireless device. Examples of the RRM requirements are handover delay, measurement reporting delay, accuracy of measurement quantity etc.

The conducted requirements are typically extensively specified. Indeed, the performance of features is primarily expressed and verified using the conducted requirements for UE, BS and other wireless devices. The conducted radio and baseband requirements for UTRA UE and UTRA BS are specified in 3GPP TS 25.101, version 10.3.0 and TS 25.104, version 10.3.0, respectively. The radio and baseband requirements for E-UTRA UE and E-UTRA BS are specified in 3GPP TS 36.101, version 10.4.0 and 3GPP TS 36.104, version 10.4.0, respectively. The RRM requirements for UTRA and E-UTRA are specified in TS 25.133, version 10.3.0 and TS 36.133, version 10.4.0, respectively.

The radiated performance requirements are to be met by the wireless device in the air. They are interchangeably called over the air (OTA) performance requirements. The radiated performance is typically worse than the corresponding conducted requirements since the latter do not take into account all factors contributing to signal loss or dispersion in the air. The OTA performance is heavily dependent on the antenna integration. Design parameters such as radiation pattern, total radiated antenna efficiency, correlation and gain imbalance will impact the OTA performance. The radio performance thus also depicts true or at least more realistic performance achieved by a wireless device in the field.

Some well known examples of performance metrics which are used for verifying the radiated performance are Total Radiated Power (TRP), Total Radiated Sensitivity (TRS), Mean Effective Radiated Power (MERP), Sensitivity (MERS) etc. These metrics are defined in 3GPP TS 25.144, version 10.0.0, and 25.914, version 10.2.0. The TRS and TRP are the radiated counterparts of the conducted receiver sensitivity and maximum output power respectively. Another example of an OTA requirement is the Specific Absorption Rate (SAR), which is used to measure impact on the human body from the exposure of RF EMF transmitted by the UE. SAR is a measure of the maximum energy absorbed by a unit of mass of exposed tissue of a person using a mobile phone, over a given time or more simply the power absorbed per unit mass. For certain use-cases where the UE is close to a human body, the SAR requirement stated by regulatory organization such as FCC will limit the maximum output power of the UE. There are UE types that can be used in several positions relative to the body, e.g. for speech and surfing, with different SAR requirements enabling the possibility to adapt the output power to optimize TRP performance and still fulfil FCC requirements.

A key challenge is to correctly define and verify the radiated performance requirements. For instance, to avoid environmental perturbations the measurements must be performed in a shielded enclosure to prevent unwanted environmental signals or reflections. Hence typically the OTA performance is verified by setting up the test in a suitable chamber, e.g. in a reverberation chamber or an anechoic chamber. This is described in more detail in 3GPP TS 25.914, version 10.2.0.

It is quite likely that two or more similar types of wireless devices (e.g. mobile terminal) have substantially different radiated performance. However their conducted performance is the same. Even different types of wireless devices, such as a plugged in device and a mobile terminal, may have the same conducted performance, but their radiated performance may still differ significantly. Furthermore, the radiated performance may also change due to various different factors, e.g. varying environmental conditions. In existing technologies, the conducted performance is typically used for radio network operation such as scheduling, power control etc. This may lead to substantial mismatch between the expected performance and the real performance in the network. As a consequence, the actual performance of the wireless devices in the field is deteriorated and the expected target performance is not met. In some cases resources are also wasted, since resources cannot be efficiently utilized.

SUMMARY

An object of some embodiments is to provide a mechanism for improving performance and/or resource utilization for wireless devices.

Some embodiments disclosed herein enable the network, e.g. a serving base station, to take the form factor of a wireless device into account e.g. when performing radio node operations such as scheduling, power control or resource allocation. Because the form factor affects the radio performance of the wireless device, having this information available enables the network to make more accurate decisions, which in turn may lead to improved performance and/or resource utilization for that specific wireless device, as well as for the system as a whole.

Some embodiments provide a method executed in a network node comprised in a wireless communications network. According to the method, the network node obtains information related to the form factor of a wireless device comprised in the wireless communications network. Based on the obtained information, the network node determines radio resources and/or appropriate physical layer parameters and/or configuration parameters for the wireless device. In particular embodiments, the wireless device is a mobile terminal or a home base station. The determined radio resources and/or parameters are then used for a network operation. In particular embodiments, the network operation may be scheduling, power control, or handover.

Other embodiments provide a network node comprising radio circuitry, processing circuitry, and a memory. The processing circuitry is configured to obtain information related to the form factor of a wireless device, and to determine, based on the information related to the form factor, expected resources required for serving the wireless device, and/or appropriate physical layer parameters and/or configuration parameters for the wireless device. The processing circuitry is further configured to use the determined parameters and/or expected resources for a network operation.

Other embodiments provide a method executed in a network node comprised in a wireless communications network. The network node obtains information related to the form factor of a wireless device comprised in the wireless communications network. The network node then sends the information related to the form factor to a second network node, thereby enabling the second network node to determine radio resources and/or appropriate physical layer parameters and/or configuration parameters for the wireless device.

Yet further embodiments provide a network node comprising processing circuitry, radio circuitry, and a memory. The processing circuitry is configured to obtain information relating to the form factor of a wireless device. In some variants, the processing circuitry obtains the information from the memory, whereas in other variants, the processing circuitry obtains the information via the radio circuitry. The processing circuitry is further configured to send, via the radio circuitry, the information relating to the form factor to a second network node.

Further embodiments provide a method in a wireless device comprised in a wireless communications network. The wireless device obtains information related its form factor, and sends the information related to the form factor to a network node, such as a radio base station serving the device.

Particular embodiments provide a wireless device comprising processing circuitry, radio circuitry, and a memory. The processing circuitry is configured to obtain information relating to the form factor of the wireless device. In some variants, the processing circuitry obtains the information from the memory, whereas in other variants, the processing circuitry obtains the information via the radio circuitry. The processing circuitry is further configured to send, via the radio circuitry, the information relating to the form factor to a network node, such as a radio base station serving the device.

Particular embodiments of the present invention may provide the following benefits and advantages:
- Enables the network to acquire and determine the wireless device form factor. This in turn enables the network to know the actual performance, in particular the radiated performance, that can be achieved by the wireless device.
- The network may use the determined form factor in improving one or more tasks related to the radio network operations (e.g. power control, scheduling, mobility control etc).
- Positioning measurement accuracy and thereby the location estimation are improved.
- The radio resources are more efficiently utilized.
- The determined form factor and associated statistics can be provided to other network nodes performing network management and planning tasks (e.g. network monitoring, network deployment, cell planning, tuning of system parameters etc)

BRIEF DESCRIPTION OF THE DRAWINGS

FIG. 1 is a flow chart illustrating a method in a network node according to some embodiments of the present invention.

FIG. 2 is a flow chart illustrating a method in a network node according to some embodiments of the present invention.

Figure 3:
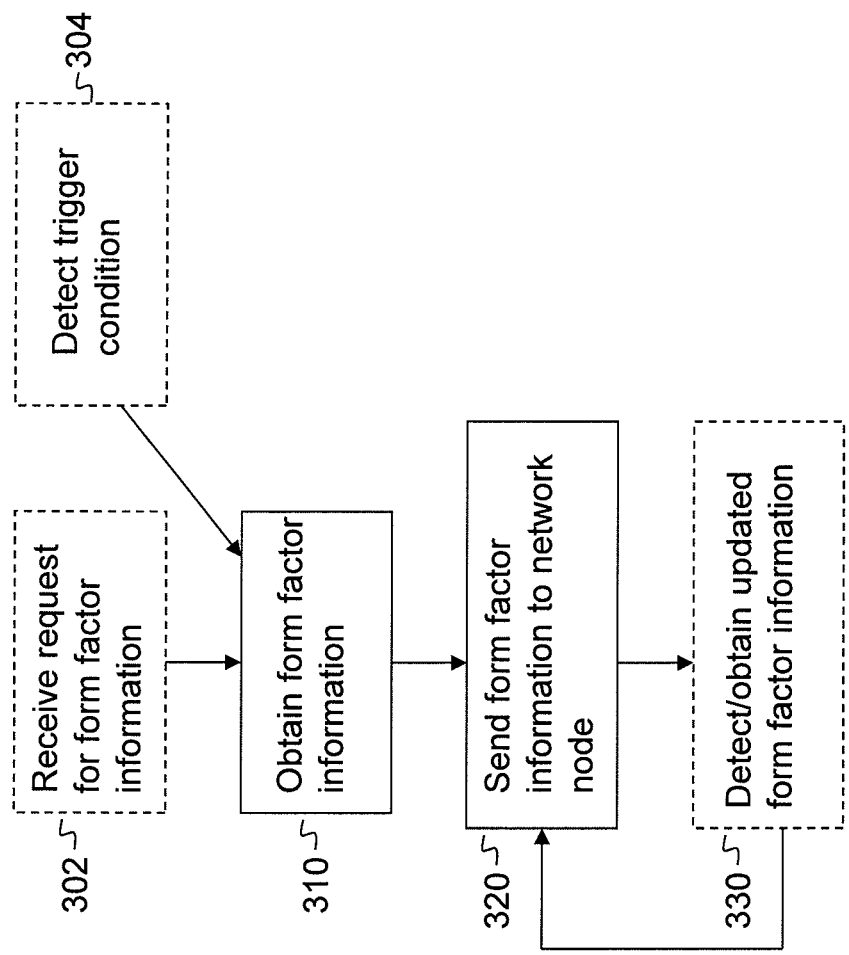
FIG. 3 is a flow chart illustrating a method in a wireless device according to some embodiments of the present invention.
Figure 4:
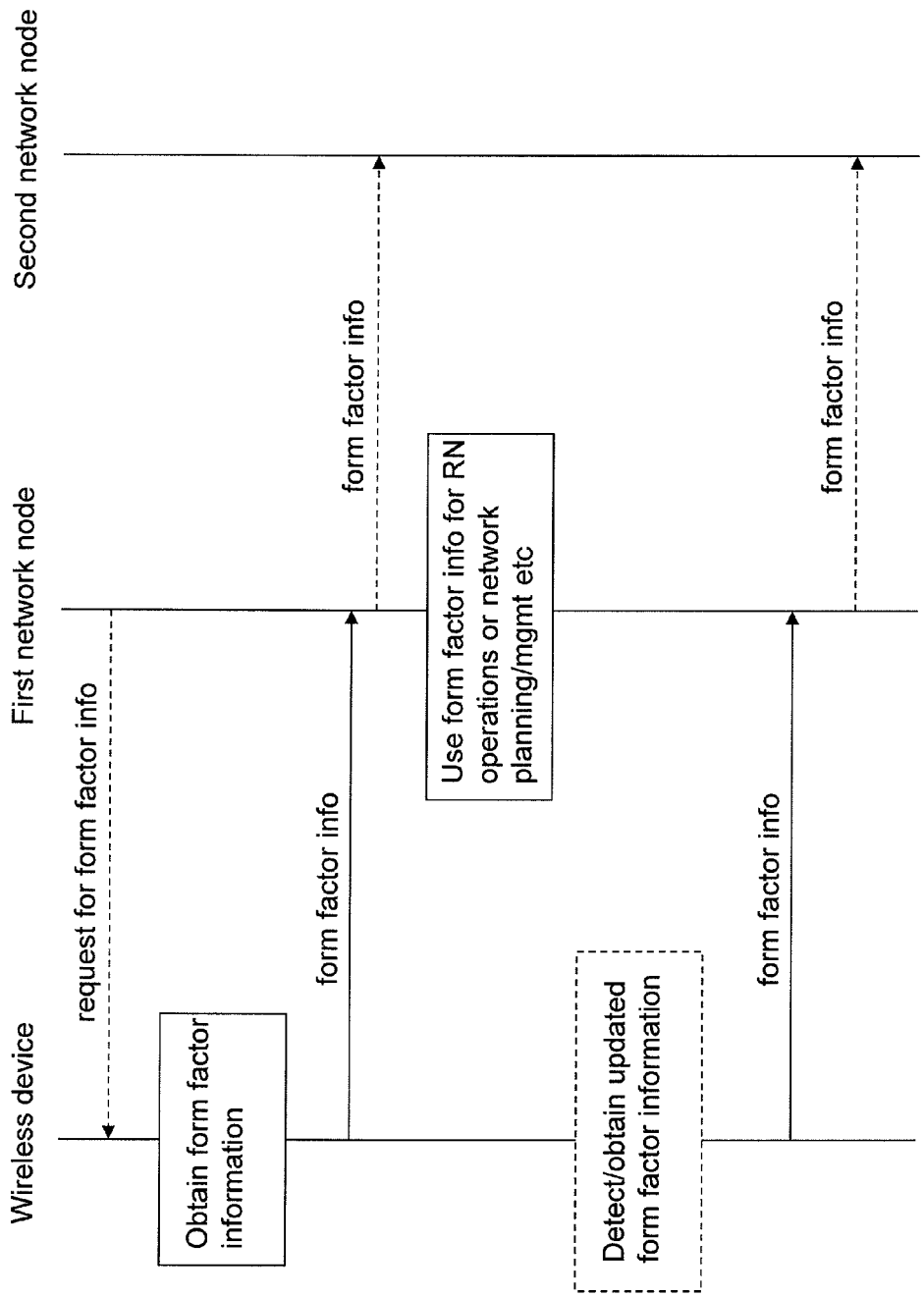
FIG. 4 is a combined signalling scheme and flow chart illustrating a method according to some embodiments of the present invention.
Figure 5:
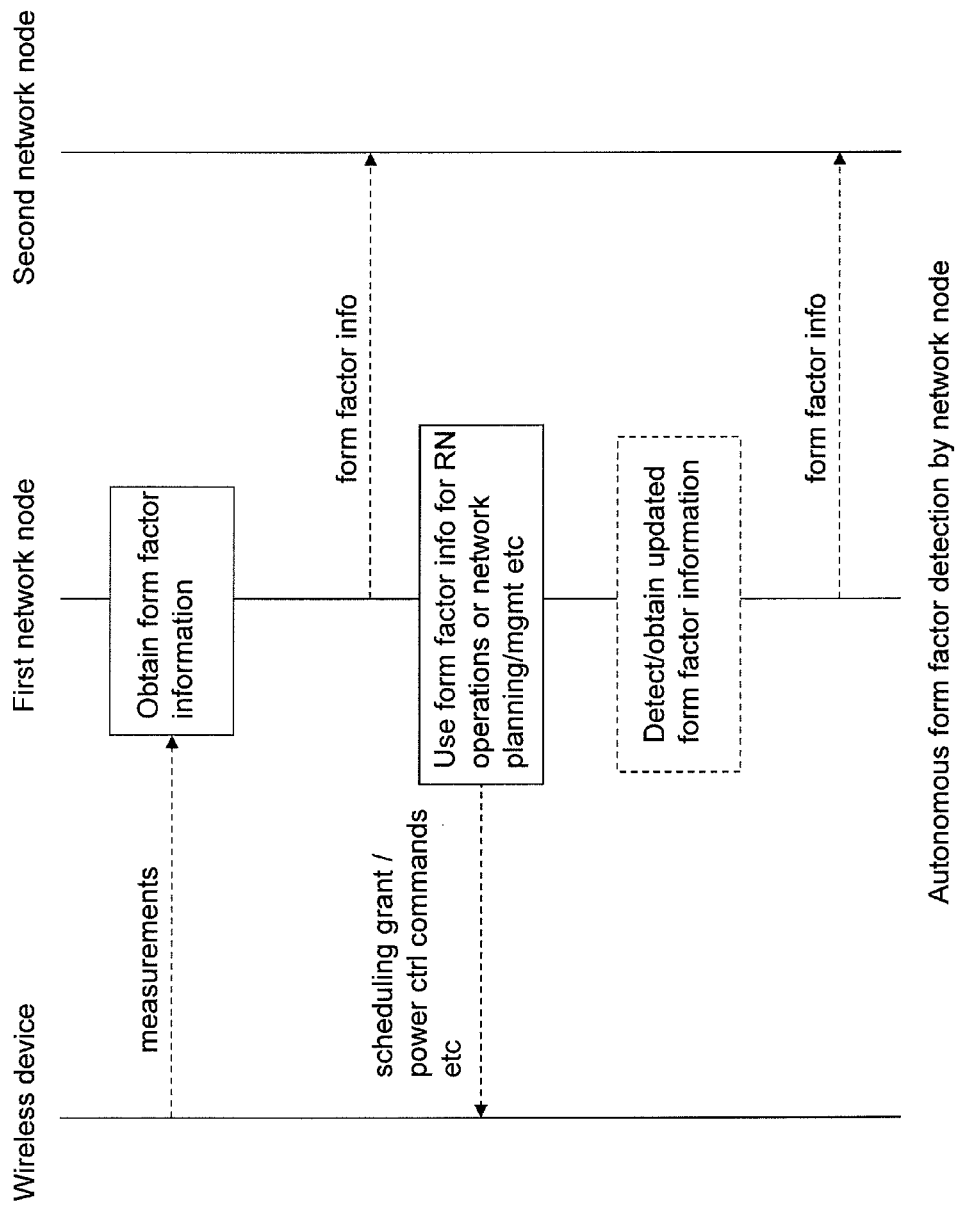
FIG. 5 is a combined signalling scheme and flow chart illustrating a method according to some embodiments of the present invention.
Figure 6:
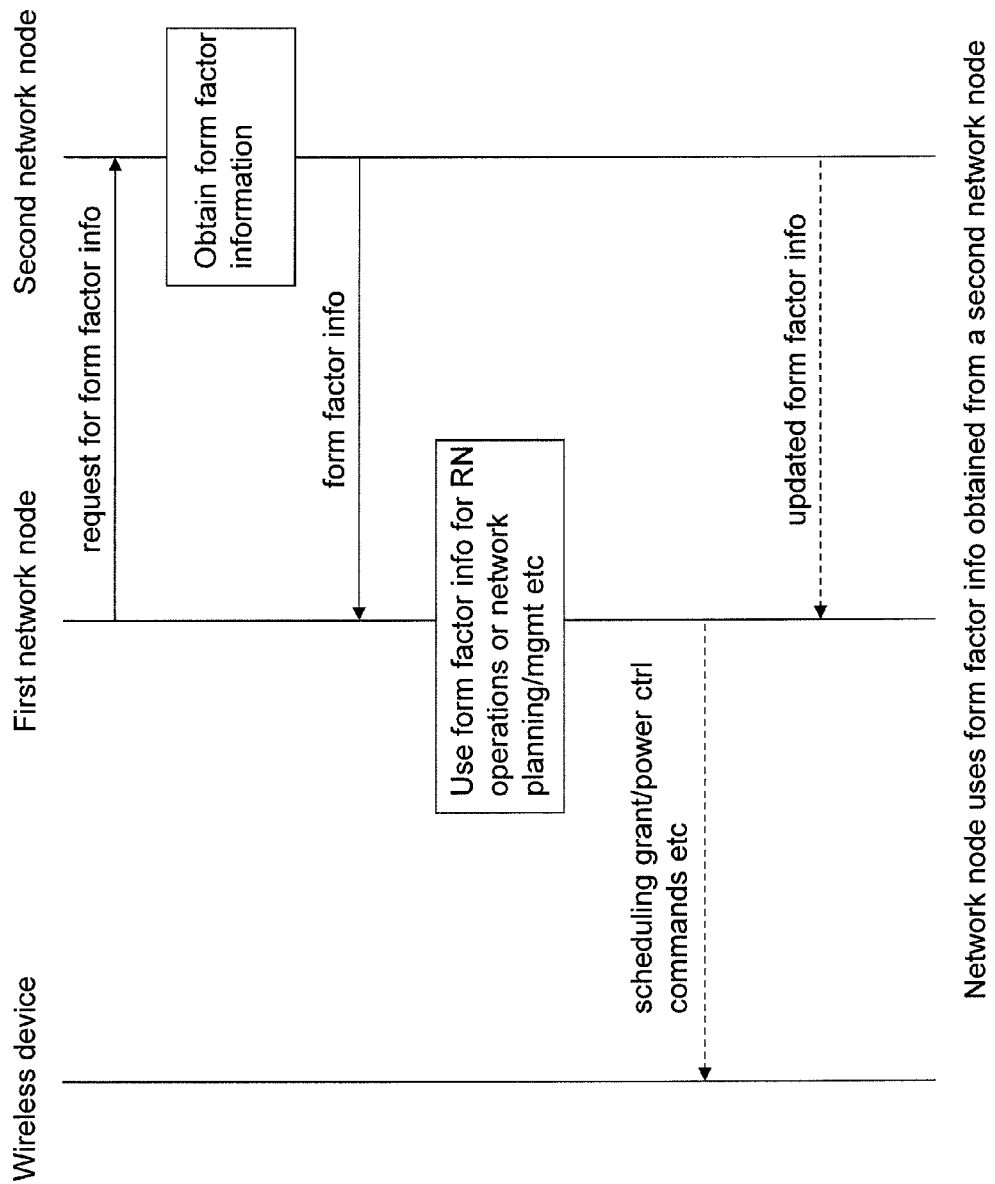
FIG. 6 is a combined signalling scheme and flow chart illustrating a method according to some embodiments of the present invention.
Figure 7:
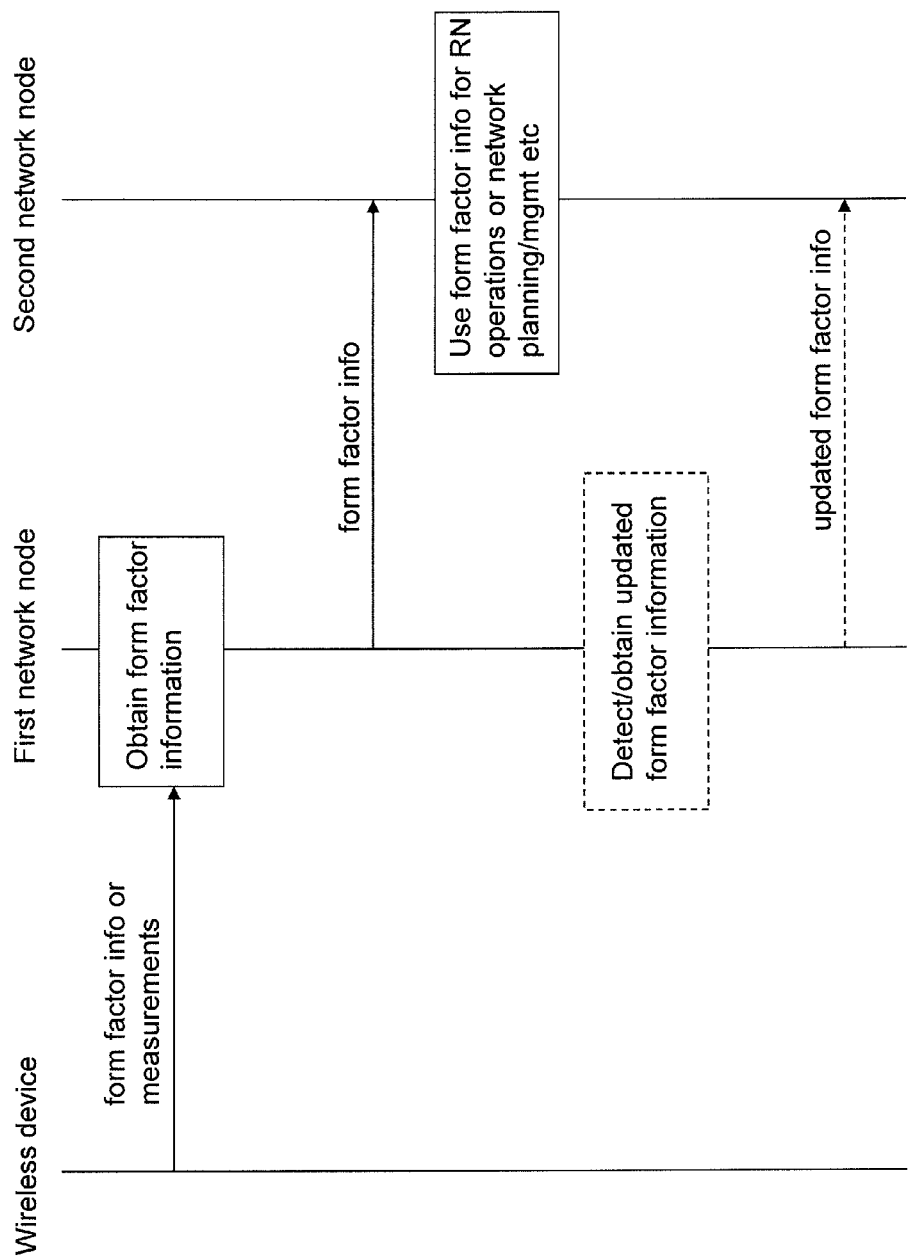
FIG. 7 is a combined signalling scheme and flow chart illustrating a method according to some embodiments of the present invention.

ABBREVIATIONS 4C 4 Carriers
AOA Angle of arrival
BS Base Station
BSC BS controller
CA Carrier Aggregation
CGI Cell global identifier
CoMP Coordinated Multiple Point Transmission and Reception
CPICH Common Pilot Channel
DAS Distributed antenna system
DeNB Donor eNode B
DL Downlink
DUT Device under test
ECGI Evolved CGI
E-CID Enhanced cell ID
E-SMLC Evolved SMLC
GSM Global System for Mobile Communications
HARQ Hybrid Automatic Repeat Request
HRPD High Rate Packet Data
HSPA High-Speed Packet Access
L1 Layer 1
L2 Layer 2
LMU Location measurement unit
LPP LTE positioning protocol
LPPa LTE positioning protocol annex
LTE Long Term Evolution
M2M Machine to Machine
MAC Medium Access Control
MDT Minimization of drive tests
MIB Master Information Block
MME Mobility management entity
MPR Maximum power reduction
MSR Multi-standard radio
MTC Machine type communication
OFDM Orthogonal Frequency Division Modulation
OFDMA Orthogonal Frequency Division Multiple Access
O&M Operational and Maintenance
OOB Out of band
OSS Operational Support Systems
OTA Over the Air
OTDOA Observed time difference of arrival
SAR Specific Absorption Rate
PBCH Physical Broadcast Channel
PCI Physical cell identifier RAT Radio Access Technology
RN Relay node
RNC Radio Network Controller
RRC Radio Resource Control
RRH Remote radio head
RRU Remote radio unit
RSCP Received Signal Code Power
RSRQ Reference signal received quality
RSRP Reference signal received power
RSTD Reference signal time difference
SMLC Serving Mobile Location Center
SON Self Organizing Network
SS System simulator
RSSI Received signal strength indicator
SIB System information block
SI System information
TE Test equipment
TRP Total Radiated Power
TRS Total Radiated Sensitivity
MERP Mean Effective Radiated Power
UE User Equipment
UL Uplink
UTDOA Uplink time difference of arrival
WCDMA Wideband Code Division Multiple Access

DETAILED DESCRIPTION

The term "wireless device" includes any type of wireless node which is able to communicate with another wireless device by wirelessly transmitting and/or receiving wireless signals. Thus, the term "wireless device" as used throughout this disclosure encompasses, but is not limited to: a user equipment, a mobile terminal, a base station, a relay node, e.g. fixed or mobile relay, repeater, a wireless device for machine-to-machine communication, an integrated or embedded wireless card, an externally plugged in wireless card etc.

The radiated performance of a wireless device is affected not only by environmental perturbations, but also by other factors such as human interaction, electronic equipment housing the device, etc. This is further complicated by the fact that the wireless devices have various physical forms. Particularly user equipments are available in wide ranging configurations such as: laptop mounted equipment in general, handheld mobile phone, externally plugged device in a computer or a laptop (e.g. USB etc), embedded devices (e.g. integrated card in a Tablet, notebook, laptop etc) etc. A change in configuration, such as the type of laptop used for plugged in devices, may affect the radiated performance. In case of handheld devices the radiated performance (e.g. TRS and TRP) may vary depending on the manner in which the mobile terminal is held by the subscriber. The performance may even be influenced by the subscriber characteristics e.g. body temperature, size of the hands etc. Similarly, the internal noise of the laptop may worsen the radiated performance of the embedded devices or USB card in the laptop. Even the size of the screen of the laptop affects the radiated performance of the integrated card or externally plugged in wireless devices.

For these reasons, the radiated performance is verified in a chamber by attaching the wireless DUT to a phantom device. This is described in more detail in 3GPP TS 25.914, version 10.2.0. The phantom device may mimic a real human user to verify the performance of a handheld mobile terminal. For example the DUT can be attached to a phantom head and shoulders for verifying the radiated performance. Similarly, a laptop ground plane phantom may be used for radiated performance verification of plugged in wireless DUT e.g. USB dongles. The laptop ground plane phantom is to reproduce the effects of the ground plane for the antenna of the DUT while avoiding the variation of the measurements introduced by a real laptop.

As compared to the conducted requirements, the radiated requirements are significantly more difficult to define and verify. Presently only limited radiated requirements are specified e.g. TRS and TRP for SISO capable handheld mobile terminals operating in speech mode, see 3GPP TS 25.144, version 10.0.0. Several network operators have defined proprietary requirements for TRS and TRP as part of their network planning and operator approval process. However, there is increasing interest to specify radiated requirements for more advanced features, e.g. MIMO, advanced receivers, and for embedded and externally plugged in devices, see 3GPP TS 25.914, version 10.2.0. Similarly, for handheld devices the impact of physical contact of a human hand on the radiated requirements is being studied under the study item "Introduction of hand phantoms for UE OTA antenna testing", described in RP-111118.

As explained above, the radiated performance of a wireless device may be affected by physical characteristics such as shape or form, or stated differently, on the "form factor" of the device. In simple terms, the "form factor" means a general physical look of a wireless device. The general physical look in turn is formed by physical parameters such as the size, shape or structure of a mobile device as will be apparent with examples below. "Form factor" is a commonly used term in literature. However, other terms such as configuration factors, shape factors, physical configuration, morphological characteristics etc may be interchangeably used for the form factor. The form factor may also be expressed in terms of, or reflect, UE radio quality level.

One reason why the form factor of a wireless device may influence the radio performance is that a device with smaller form factor cannot afford to have sufficiently large antennas. It may also be challenging to provide a sufficient number of multiple antennas, or to provide antennas that have to be closely spaced while maintaining antenna performance and RF interference requirements. Thus for larger devices like outdoor base stations, the impact of form factor on the radio performance is generally small. However, the form factor of a handheld device such as a mobile terminal, or any smaller wireless device such as a home base station, sometimes referred to as a femto BS, may highly influence the radio performance.

For example, handheld mobile terminals typically have one of the following basic morphological configurations: bar, clamshell, flip down or fold, slide, swivel etc. These different shapes and sizes affect the form factor which in turn influences the radio performance and the ability to meet radiated requirements.

Today, advanced terminals are available in different packages, size and weight, such as PDA, tablet, cameras, netbook, gaming console and notebook. These devices typically have large form factor.

Plugged-in USB cards, embedded devices or integrated cards etc bear different form factors compared to traditional phones. Plugged-in USB devices have a relatively smaller form factor, where the host computer on which they are mounted or connected affects the overall radio performance. For embedded devices, the effective form factor may be larger as antennas can also be integrated in the computer. The band allocation for LTE will put challenging requirements on the antenna installation in a portable device since the area needed for the antennas will increase as a function of supported frequency bands. New techniques with active tunable antennas are under evaluation. Active antenna arrangements may result in a situation where antenna performance will depend on frequency band and channel selection.

Another category of emerging wireless devices is characterized by hybrid configuration. For example the device screen configuration can be altered by the subscriber by extended or shortening the screen size. An example of such a device is a tablet with attachable keyboard. In the scenario where a touch screen is used, the presence of human hands will attenuate RF signal and affect antenna performance.

Reconfiguration of the screen or any other part of the wireless device affects its total radiated performance.

The form factor of wireless devices for machine-to-machine (M2M) communication, also referred to as Machine Type Communication (MTC), may also vary substantially depending upon the application. The M2M is used for establishing communication between machines and between machines and humans. The communication may comprise exchange of data, signaling, measurement data, configuration information etc. The device size may vary from very small, e.g. wallet-size, to the size of a base station. The form factor of M2M or MTC devices is thus quite unpredictable. M2M devices may be configured both for mobile operation and static operation. In the case of static M2M devices, they could be used together with directive antennas compensating for poor signal environments.

Generally, the form factor of the wireless devices may be categorized into smaller and larger. In principle, the conducted radio requirements can be affected by the form factor of a device. However, for the sake of simplicity, the conducted requirements including radio requirements of a wireless device are specified to be the same for all form factors. Such requirements can be fulfilled by devices bearing different form factors. The reason is that such conducted radio requirements are also verified under specific test setup which could eliminate the conditions that affect the form factor related performance. In practice, however, devices having different form factors will exhibit different performance.

Particular embodiments disclosed herein provide mechanisms whereby information related to the wireless device form factor, which reflects the actual radio performance, is determined by the network. The network uses at least this acquired information to improve the network performance.

Some embodiments provide means to determine information related to the form factor of a wireless device, where the form factor may be static or dynamic, and use this information for radio network operation, e.g. radio resource assignment, radio resource management, or radio link maintenance. The wireless device may for example be a UE or a radio network node, such as a home base station.

Some embodiments disclosed herein enable the network node to determine the form factor or radio configuration of the wireless device and use the determined form factor for one or more radio network operations.

An example method in a wireless device, such as a mobile terminal, user equipment, or a fixed wireless node, comprises:
  Reporting its form factor to the first network node, e.g. serving node, autonomously, e.g. initially or when form factor changes, or upon explicit request from the first network node.
  Reporting additional information or an indicator to the first network node, e.g. serving node, in case the form factor changes, e.g. due to physical modification etc.
  Report distance to body and/or orientation. Tablet type devices may be capable of both voice and data service. If such a device is placed close to the body, as for a voice call, the output power may be reduced.

An example method in a first network node, e.g. a serving node, comprises:
  Determining the form factor of the target wireless device by explicit signaling or autonomously or combination thereof.
  Using the determined form factor for performing one or more radio network operation task.
  Signaling the determined form factor or associated information to other network nodes (second network node), which may use the acquired information for one or more network planning and management tasks.

Before turning to a more detailed description of specific embodiments, we will first discuss how the form factor of a wireless device may be defined, how the form factor may be determined and what parameters it may be based on, as well as how information relating to the form factor may be represented, stored, and transmitted to other network entities.

One basic aspect of this disclosure is to define one or more parameters characterizing the wireless device form factor, which in turn may depict the radiated performance characteristics of wireless device. The wireless device may use these parameters to indicate its form factor to the network node, which may use it for different purposes as described in later sections. The form factor can be expressed in different manners. This is described with several examples.

In one example the form factor is expressed in terms of the morphological characteristics of the device such as in terms of shape and size. More specifically it may be expressed in terms of: small, medium and large. There can also be more than three levels, e.g.: very small, small, medium, large and very large.

In another example the form factor is expressed in terms of antenna correlation characteristics in case the wireless device supports multiple receiving and/or transmitting antennas. For example, two or more antenna correlation levels can be predefined such as low, medium and high. There may be more than three correlation levels: very low, low, medium, high and very high. The wireless device may even report its actual antenna correlation value, which can be expressed in terms of correlation coefficient, some possible example values being 0.1, 0.5 and 0.9, or percentage, some example values being 10%, 50% and 90%. The mapping between different correlation levels and correlation coefficient may also be pre-defined. This is shown as an example in Table 1. The mapping can be the same or independent for antenna correlation for receiving antennas and the transmitting antennas.

TABLE 1

Mapping between antenna correlation levels and coefficients

| ID | Correlation levels | Correlation coefficient (ρ) range |
|---|---|---|
| 0 | Low | $\rho \leq 0.1$ |
| 1 | Medium | $0.1 < \rho \leq 0.5$ |
| 2 | High | $0.5 < \rho \leq 1$ |

The antenna correlation between two antennas will depended on the distance between the antenna elements, frequency and antenna element type. In general the antenna correlation will be lower for a large device, but for cases were the antenna system is well integrated the correlation will be low independently of form factor. The antenna correlation will vary when the human body is in close vicinity of the device. It should be noted that a "large" form factor is not necessarily associated with a large physical size of the device, although this will often be the case in practice. For example the form factor may also depend upon the surface area or total amount of the conductive material used in the wireless device and in particular on the surface of the wireless device. This means a large device built primarily with non conductive material may not be classified as having a larger form factor. Furthermore the conductivity of the material used to build the wireless device may also affect its form factor. For example, a large wireless device built with a material with lower conductive material may not be classified as a device with larger form factor.

Thus, it should be appreciated that classifying the form factor as "large", for example, does not necessarily imply a certain physical size, but may reflect a high radiated performance. Similarly, a "small" form factor may correspond to low radiated performance. Classifications other than "small", "medium" and "large" may of course be used without deviating from the concept. For example, the form factor may be denoted by an index, such as 1, 2 and 3.

Network operators will require that TRP and TRS are measured for each branch separately together with the antenna correlations as part of the validation of MIMO performance, in free space, and/or using head and hand phantoms. The antenna correlation could be stored in the UE memory and sent to the first network node, e.g. through control signaling.

The mapping between antenna correlation and the form factor may also be pre-defined. This is expressed by an example in table 2. For example when a wireless device, such as a UE, has large form factor the corresponding antenna correlation is typically low. This is due to the fact that the antennas can be more easily physically separated.

TABLE 2

Mapping between antenna correlation levels and form factor

| ID | Correlation levels | Form factor type |
|----|--------------------|------------------|
| 0  | Low                | Large            |
| 1  | Medium             | Medium           |
| 2  | High               | Small            |

Similarly, the mapping between the correlation coefficient and the form factor can also be pre-defined.

In yet another example the wireless device, e.g. UE, may report information related to physical separation between antennas. This in turn may depict the form factor of the wireless device, e.g. UE. For example, the separation may be expressed in terms of small, medium or large. The small, medium and large separation levels may also be mapped to pre-defined separation distances, each of which in turn may correspond to a certain form factor. An example mapping between the three parameters is shown in table 3.

TABLE 3

Mapping between antenna separation levels, antenna separation distance range and form factor

| ID | Antenna separation Levels | Antenna separation distance (d) range | Form factor type |
|----|---------------------------|---------------------------------------|------------------|
| 0  | Small distance            | d ≤ 5 cm                              | Large            |
| 1  | Medium distance           | 5 cm < d ≤ 10 cm                      | Medium           |
| 2  | Large distance            | d > 10 cm                             | Small            |

In yet another example the form factor is expressed in terms of the expected radio quality or radio performance of the device due to its form factor. Stated differently, an expected quality metric may be provided, which is based on the form factor of the device. For example, the expected quality metric to depict the form factor may be defined in terms of discrete values between 0-4 where 0 is the worst quality and 4 represent the best quality due to form factor characteristics of the device. More specifically the discrete values: 0, 1, 2, 3 and 4 may represent very poor, acceptable, fair, good and very good/excellent respectively. The wireless device may report to the network the value corresponding to the quality it can offer due to its form factor characteristics. The terms "information related to the form factor" and "form factor information" as used herein are intended to encompass also such a quality metric, as well as other metrics or parameters that are directly or indirectly based on, and reflect, the form factor.

The antenna correlation depends upon the carrier frequency, antenna configuration, ground plane configuration and antenna element type. A wireless device typically supports multiple bands with different frequency ranges (e.g. 900 MHz, 2 GHz, 2.6 GHz bands etc). Therefore the parameters associated with the antenna correlation characteristics may be defined per frequency band supported by UE or any wireless device. In order to reduce signaling overheads another possibility is that the correlation may be defined to be reported by the UE for only selected frequency ranges or bands. For example the UE may report the information association with the antenna correlation for one or more of the following selected cases e.g. antenna correlation at:
  Lower frequency bands (e.g. 1 GHz or low)
  Higher frequency bands (e.g. above 1 GHz)
  Reference frequency band (e.g. 2 GHz)
  One of the frequency band supported by wireless device
  Selected frequency bands (e.g. lowest and highest supported bands)

The network may determine the expected correlation, and thus the radiated requirements levels, on other bands from prior art principles, since correlation depends upon the frequency.

The form factor may also be expressed in terms of function, usage, application or offered services. The reason for this classification stems from the fact that devices with different functions may be associated with different radiated performance requirements. For example from a function or application point of view the wireless devices may be classified into the following non-exhaustive categories:
  Embedded or plugged in devices
  USB dongle or externally connected devices
  Handheld device or any type of handset
  Voice mode close to human head or surfing mode
  Devices for machine type communication
  The above classification may be further subdivided into:
  Embedded or plugged in devices:
    Device mounted in small computers (e.g. laptop or iPAD)
    Device mounted in large computers (e.g. desktop or work station)
  USB dongle or externally connected devices
    Device plugged in small computers (e.g. laptop or iPAD)
    Device plugged in large computers (e.g. desktop or work station)
  Handheld device or any type of handset
    Small (e.g. classical)
    Large (e.g. smart phones)
  Devices for machine type communication
    Very small form factor (e.g. weather sensors)
    Large form factor (e.g. for managing complex machinery).

The form factor may also be categorized into static or semi-static or dynamic, depending on whether the form factor of the device may change. The form factor may change over a short time period (e.g. within less than 1 second) or over a longer time scale (e.g. within few minutes or even hours).

Static Form Factor:

The form or structure of a conventional wireless device generally does not change. Thus, such parameters may be regarded as static form factors. For example a traditional handset or mobile phone has a fixed form factor, which may fall into any of the categories or types described above. Hence, such devices may signal their form factor to the network node during specific occasions (e.g. at call setup, at handover etc) using any of the principles stated above. The static form factor typically takes on one of several pre-defined values. Thus, the form factor of each wireless device may be stored in the device memory at the time of manufacturing.

Semi-Static or Dynamic Form Factor:

However, the form factor in several emerging devices may vary over time, for instance because the device can be attached to one or more auxiliary equipment such as an external antennas, extended key pad, modification of screen size (e.g. in iPAD hybrid) etc. Similarly, an externally plugged in device such as a wireless USB could be reconnected from the current base equipment to a new one, thereby modifying the device form factor. For instance, a wireless USB may be moved from laptop to desktop or a work station. or vice versa. The type of computer used generally affects the background noise, which in turn impacts the radio performance of the wireless device. This type of change in the form factor may not typically occur very often (e.g. in the order of 10's or 100's of ms) but rather over a longer time scale (e.g. in the order of seconds or minutes). On the other hand, contact with or proximity to the human body, notably head and hands, may impact the form factor of handheld wireless devices (e.g. mobile phone) on a much shorter time scale e.g. in the order of 100's ms. If a device such as a tablet is placed close to the body, as for a voice call, its output power (i.e. radio power) may be reduced. This in turn will affect the uplink received quality. Therefore the change in the form factor due to interaction with external environment, auxiliary device, baseline equipment or human body can be classified as semi-static or dynamic. This is in contrast with static form factors, where the radio characteristics of the device remain unchanged over time. From the perspective of radiated performance of the wireless device, a semi-static or dynamic change in its form factor during a session may have substantial impact on the system performance. For example the antenna correlation may become worse if the handheld device is firmly held covering its antennas. Similarly, a large computer may cause deterioration in the Total Radiated Sensitivity (TRS) of the plugged in wireless device due to increased screen noise. The device form factor may also be modified e.g. by increasing or decreasing number of antennas; this may apply for instance to devices like small base stations like home base stations, mobile relays, wireless CPE, medium or large wireless devices for machine type communication etc. Hence, in some embodiments which will be described in more detail below, the wireless device signals its form factor also when its form factor is modified. This requires that the wireless device has means to detect and quantify the change in the form factor. This is done by observing variations in radio characteristics (e.g. radio receiver and/or transmitter) performance under certain conditions, e.g. while the resource allocation and/or radio environments are unchanged. The change in form factor itself or the occasion when the wireless device re-evaluates its form factor can also be triggered or stimulated by external factors. For example the triggering may occur when the auxiliary or base equipment is introduced, removed or modified.

The performance measures used for reporting semi-static or dynamic form factor may be the same as disclosed above. To reduce signaling overhead, the wireless device may report only the difference compared to the previous report or compared to a reference value. This depends upon the type of performance measure. If the reporting is done in terms of antenna correlation or separation, then the difference compared to the previous reported value or compared to a reference value can be reported to the network by the wireless device to indicate the new form factor. The network may also configure the wireless device to report a change in its form factor provided its modified form factor is retained over certain time period (T1). The network may additionally configure the wireless device to report a change in its form factor provided its modified form factor remains within a certain limit (e.g. threshold in terms of antenna correlation etc) and/or remains constant over a certain time period (T1). These parameters may also be pre-determined and in that case they are not signaled or configured by the network. The parameters may either be different or common for different types of devices. Similarly the parameters may either be specific to a particular form factor reporting measure, as described above, or common for all types of measures. The wireless device may also obtain statistics related to change in form factor or form factor experienced over a certain time. For example the wireless device, e.g. handheld device. may report the amount of time during which it has experienced a certain form factor. The amount may be expressed as absolute value (e.g. in seconds) or as a percentage of the total call or session time. The wireless device may report such statistics to the network, which may use them for various purposes as will be further described below.

The expressions "information related to form factor" and "form factor information" are used interchangeably herein to denote information related to any of the metrics describe above, which directly reflect or are based on the form factor of a wireless device. Apart from the actual form factor (e.g. "large"), also referred to herein as the form factor value or form factor type, the form factor information may also comprise other related data, such as an indication of which metric (e.g. antenna correlation, size, form, radio quality etc), or which combination of metrics, the form factor information relates to. As one particular example, the form factor information could comprise ("size", "large"), where "size" is the form factor metric indication and "large" is the actual form factor or, stated differently, the form factor metric "size" has the actual value, or type, "large". The form factor metric indication may be represented by one out of a set of pre-defined values, e.g. as an index into a table of available form factor metrics. The form factor information may comprise information relating to more than one form factor metric. In this case the different metrics may be combined into a single value, e.g. by a weighting or averaging operation, or alternatively the form factor information may comprise two or more separate form factor values, each of which may be associated with a form factor metric indication.

A method in a wireless device for providing information relating to its form factor to a network node will now be described, with reference to the flow chart in FIG. 3.

In a step 310, the wireless device obtains information relating to its form factor. For example, information related to the antenna setup, such as antenna distance or antenna correlation, may be accessible via RF circuitry comprised in the radio circuitry of the device. In some variants, form factor-related information has been pre-stored in the device memory, e.g. at manufacture, in which case the wireless device obtains the information by retrieving it from memory.

Such pre-stored information may be in the form of actual physical parameters such as size or material conductivity, or in the form of an index or predefined category, e.g. one of the values "small", "medium" and "large", as described above. In other variants, the form factor information is determined by the wireless device, e.g. based on radio measurements. This may be achieved in a similar way as when the network node autonomously determines the form factor information, as will be described in connection with FIG. 1 and step 120 below.

The wireless device then sends the information relating to its form factor to a network node in step 320. In particular variants, the wireless device may report one or multiple parameters or information related to its form factor, as described above, to the network node. For example, any combination of the following characteristics of the wireless device may be reported:

Morphological characteristics (e.g. small, medium or large form factor)
Antenna correlation characteristics (e.g. low, medium, high)
Antenna separation characteristics (e.g. small, medium, large)
Functional characteristics (e.g. USB, embedded, handset, machine type communication etc)

The target network node receiving the wireless device form factor information is typically a serving or a configuring network node. This is referred to as first network node for simplicity of explanation. The first network node is generally any serving radio network node or core network node or even a positioning node. Examples of the radio network node are eNode B, Node B, RNC, relay, base station, femto node, donor node (e.g. DeNB etc). Examples of core network node are MME, access gateway etc. Examples of positioning node are any location server, E-SMLC etc.

The signaling of form factor information to any of the above network nodes in step 320 may be done using any suitable protocols such as RRC, LPP, MAC, L1 signaling etc.

Optionally, the form factor information comprises a form factor metric indication. The form factor metric indication indicates which metric the form factor relates to, as described above. The form factor metric may be any of the parameters described above as being related to the form factor of a device, e.g. antenna correlation, correlation coefficient, antenna separation, shape, form, orientation, material conductivity, radio quality etc. Another possibility is that the form factor information may comprise more one than form factor metric indication and form factor value pair.

Including a form factor metric indication is, however, not mandatory. For example, which metric to use may be pre-defined in a standard or in a separate configuration message. Furthermore, the form factor may be defined as a combination, or possibly a weighted combination, of two or more metrics.

In this example, the wireless device initiates the procedure for obtaining and reporting the form factor information autonomously, for example when the device is powered on. This may also be referred to as proactive reporting.

However, in particular variants, the wireless device may report its form factor, which may be static, semi-static or dynamic in any of the following manners:

1. Proactive reporting without receiving any explicit request from the target network node
2. Reporting upon receiving any explicit request from the network node. This is illustrated in FIG. 3 as optional step 302.

In case of proactive reporting the wireless device may report its form factor during one or more of the following occasions, as illustrated by optional step 304:

I) During initial deployment/installation or redeployment/reinstallation or configuration of wireless device.
   a) This particularly applies to the devices which are typically fixed e.g. device for machine type communication, small base station like femto or home base station. However this may also apply to movable devices such as mobile relay deployed in a movable vehicle (e.g. bus, train, boat etc).
II) During initial setup. Examples are call setup, session initiation, while establishing the RRC connection etc
III) During cell change. Examples are handover, RRC re-establishment to a target cell, RRC connection release with re-direction to a target cell, PCell change or PCC change in multi-carrier system (aka carrier aggregation) etc.
IV) Upon change in cell which changes carrier frequency or frequency band. Examples are handover or PCell change from 700 MHz to 1900 MHz.
V) Upon physical layer reconfiguration: Examples are change in antenna transmission and/or reception mode such as from 1×2 to 2×2 antenna configuration etc.
VI) Upon change in form factor.
   a) This applies when the form factor changes semi-statically or dynamically.
VII) Periodic reporting
   a) The periodicity of reporting can be pre-determined or configurable by the target network node receiving the form factor information. This particularly applies to the case when form factor changes (i.e. semi-static or dynamic).

One or more proactive reporting principles may also be linked with the type of wireless device and whether the form factor is static or semi-static or dynamic. For example the mechanism 1) can be linked to static form factor reporting. Similarly mechanisms IV) and V) can be linked to dynamic or static form factor reporting. The remaining ones can be linked to any type of form factor reporting: static, semi-static or dynamic.

The form factor reporting upon receiving any explicit request from the network node can be carried out whenever the wireless device receives the request from the network. For example the network may send request to the wireless device to report its form factor at initial setup, during or just after handover or whenever the network determines or suspects that the form factor has or is expected to changed. The network may also send request to the wireless device to report its form factor if it determines that the currently used wireless device has changed (e.g. using the same SIM but in a different wireless terminal). The network can determine this change by receiving an indication from the wireless device by various means e.g. detection by an application program which runs on specific device, explicit indication by the subscriber using an application program, by comparing the manufacturer information (e.g. brand name, part number etc) associated with the previously used wireless device type (stored in database) with the manufacturer information associated with the currently used wireless device type. The manufacturer information can be obtained implicitly via application program or explicitly by an indication sent by the wireless device (e.g. in a higher layer signaling message).

Generally, the requesting and receiving nodes are the same. However, they may also be different. For example the RNC may configure the UE to report its form factor periodically to its serving Node B.

In an optional step 330, the wireless device detects that the form factor has been modified. The modification in the form factor may occur due to one or several reasons described earlier. For example, if the subscriber inserts the subscriber interface module (SIM) card in another wireless device then the form factor may be reported. In response to detecting this change in form factor, the wireless device obtains updated form factor information and sends the updated information to the network node in step 320. For example, the wireless device may conclude that a change in form factor has occurred if it detects that new accessory equipment, such as a keyboard or screen has been plugged in, if the orientation of the device has changed, or if the wireless device observes an unexpected change in radio quality based on performed measurements.

With reference to the flow chart in FIG. 1, a method in a network node according to some embodiments will now be described.

In a step 120, the network node, interchangeably referred to as the "first network node" below, obtains information relating to the form factor of a wireless device, which is able to communicate with the network node. As a non-limiting example, the network node may be the serving base station for the wireless device. According to this embodiment the network node, e.g. the serving base station, obtains the form factor information by autonomously determining the form factor of the wireless device under its control. This method is particularly useful in case the signaled form factor is not available, or the wireless device does not have means to report its form factor to the first network node. In particular, legacy wireless devices may not be able to report form factor information even if such signaling is introduced for new or future devices.

The first network node may use one or more of the following methods to determine the wireless device form factor in step 120:

1. Measurement results under certain conditions;
2. Radio resource usage under certain conditions;
3. Achieved bit rate for assigned resources under certain conditions; or
4. Combined metric The measurement results may be based on measurements done by the wireless device, the network node or by another device or node. The common factor is that the measurement should involve one or more signals transmitted by and/or received at the wireless device, wherein some aspect or characteristic of the signals reflects, or is affected by, the form factor. Examples of measurements are UE signal strength (e.g. RSRP in LTE), UE signal quality (e.g. RSRQ in LTE), UE transmit power, CSI measurements (e.g. CQI) etc. Once the measurement results are obtained, the network node may compare the measurement results with a certain reference value applicable under certain conditions. The conditions may comprise radio environment (e.g. non-dispersive channel), wireless device speed (e.g. low speed such as 3 km/hr), carrier frequency (e.g. 2 GHz), antenna configuration (e.g. 2×2 MIMO), wireless device location in cell (e.g. in cell border), cell load/interference (e.g. low load—20% cell usage) etc. For example, if the measured results are comparable to the reference value under the above conditions, then the wireless device's form factor is determined to be medium. If the measured result is below the reference value, or if it is below the reference value by a certain margin or threshold, then the network node may assume that the wireless device has a small form factor. For example, high correlation due to small form factor may lead to a lower RSRP measurement. The network node may use one or multiple measurements to obtain reliable results. For example, the form factor may be determined if most measurements lead to the same conclusion e.g. the form factor is determined to be small if all measurements, or N out M measurements (N≤M), reveal that form factor is small. To further validate the determined form factor, the measurement results can be obtained under another set of conditions, e.g. at different carrier frequency and antenna transmission mode etc, and compared with the applicable reference value.

Radio resource usage may be expressed in terms of channel utilization (e.g. resource block usage in LTE) for obtaining a certain data rate. The first node may compare the resource utilization or resource usage efficiency with a certain reference resource usage value applicable under certain conditions, to determine the wireless device's form factor. The conditions can be the same as listed in connection with the measurement results above. The condition may also include traffic characteristics, e.g. continuous and constant bit rate transmission, voice service etc. As an example, if the resource usage or required resources to achieve certain bit rate under the above conditions is comparable to the reference value, then the wireless device's form factor is determined to be medium. If the required resources are larger than the reference value, or larger than the reference value by a certain margin/threshold, under the above conditions, this may be taken as an indication that the wireless device needs additional resources to achieve a certain reference bit rate. As a result, the form factor is determined to be low. The determination may be done based on uplink and/or downlink resource usage.

The form factor may also be determined, in step 120, based on achieved bit rate for assigned resources under certain conditions. The first node may compare the achieved bit rate with a certain reference bit rate value applicable under certain conditions, to determine the wireless device's form factor. The conditions may be the same as listed above for measurement results and radio resource usage. The condition may additionally comprise the amount of resources assigned, e.g. in terms of number of resource blocks. Similar to what has been described above in connection with measurement results and radio resource usage, when the achieved bit rate is comparable to the reference value then the determined form factor is determined to be medium. If the achieved bit rate is lower than the reference value, or lower than the reference value by a certain margin. then the form factor is determined to be small.

Yet another way of determining the form factor is to combine two or more of the above metrics. Thus, the network node may use two or more of the above criteria to determine the form factor of the wireless device in step 120. For example, the determined form factor may be considered to be reliable provided at least two methods, e.g. determination based on measurements and achieved bit rate, lead to the same conclusion.

The network node may determine the form factor at suitable occasions such as those mentioned above, e.g. at initial setup, during cell change, modification of form factor due to new installation/deployment, physical layer reconfiguration etc. The network is aware of the above actions. Therefore the network (e.g. the network node) may initiate the form factor determination when one or more of these actions are performed or occasions occur. In this way, the network can also determine the form factor of the wireless device if the form factor changes semi-statically or dynamically.

Several methods for determining the form factor autonomously by the network node have been described above. However, in another variant, another network node determines the form factor and provides the results to the network node. Thus, in this variant the form factor information is obtained in step 120 by receiving form factor information from another network node, or from the wireless device.

Once the network node has obtained the information relating to the form factor using any of the means describe above, the network node uses the form factor information for radio node operations, or network management or planning etc., in step 130.

Examples of existing radio network operations whose performance may be significantly improved by using the wireless device form factor are:

Power control, e.g.
  minimum power is transmitted to achieve the target bit rate on UL and/or DL
Radio link quality control, e.g.
  ensuring that a certain target service quality is met in UL and/or in DL (e.g. 1% BLER for speech).
Radio link monitoring, e.g.
  ensuring serving cell quality is checked regularly on UL and/or DL and appropriate action is taken in case cell quality deteriorates
Scheduling performance, e.g.
  Efficient assignment of radio resources in UL and/or DL
Link adaptation, e.g.
  Transport format (e.g. code rate, transport block/data block size, modulation scheme) is adapted to ensure the target service quality is achieved. For example, a more robust format or modulation and coding scheme (MCS) is used if the radiated power of the device is low or reduced e.g. due to being close to body.
Coverage
  The coverage of wireless device is retained in a cell to the extent possible while maintaining desired quality
Measurement control e.g.
  The UE or network node may be configured with parameters to perform one of more measurements for various purposes e.g. mobility, network monitoring etc
Mobility control e.g.
  Handover, PCell change etc are performed appropriately to prevent call dropping, avoid unnecessary cell change, continuity of on going service while cell change
Physical layer configuration e.g.
  Selection of antenna transmission mode (1×2, 2×2, 4×2 etc) etc
Positioning
  Positioning measurements used for determining wireless device location are performed with good accuracy and within shorter duration. This in turn improves the corresponding positioning accuracy (e.g. measured in meters) of the wireless device.

Traditionally the above tasks or operations are based solely on conducted measurements or criteria derived based on conducted measurements. Even in case of radio measurements, the form factor considerations have not taken into account in the prior art when performing the above tasks. However, by using the determined form factor of the wireless device, the actual radiated requirement levels may be determined by the first network node. The achievable radiated requirements (e.g. TRP) will reveal more exact resources required to perform certain tasks. For example, consider two devices: device #1 and device #2. These two devices operating under similar conditions may exhibit a 1 dB difference in their TRP levels, due to differences in their form factor. Further assume that device #1 is 1 dB worse than device #2. This means that for tasks such as UL power control, the network may set a more aggressive target quality for device #1 to ensure good power control performance. In prior art solutions, the same power control target for these two devices may result in that the device #1 fails to achieve the target quality.

Thus, in a particular variant, the network node sets the power control target for the wireless device based on the form factor information in step 130. As a particular example, the network node may set a more aggressive power control target if the wireless device has a larger form factor.

Similarly, for uplink scheduling for device #1 the network may allocate resources with more robust transport format (e.g. QPSK and lower coding rate) to achieve good quality also in cell border region. In power limiting situation the device #1 will perform poorly since its maximum output power is 1 dB lower compared to device #2.

Similarly the device with smaller form factor may have higher TRS level which leads to relatively power downlink performance (e.g. DL radio link monitoring). In this case, the network may assign more robust resources (e.g. QPSK) when such device is in cell border even though conducted measurement results (e.g. CSI) reveal better downlink quality. Therefore, by using form factor information the target service quality can be met with minimum retransmission of packets or data blocks.

Thus, in a particular variant, the network node selects the modulation and coding scheme (MCS), or MCS-related parameters, for the wireless device based on the form factor information in step 130. As a particular example, the network node may use a more robust MCS if the wireless device has a smaller form factor.

The first node may also take into account the form factor of the wireless device for selecting one or more measurement control related parameters such as the measurement bandwidth, carrier frequency over which measurements are to be done etc. For example if the form factor is small then UE measurement performance may be worse or incorporate a large measurement error or bias. Therefore, to improve measurement accuracy the network may request the wireless device, e.g. UE, to perform measurements (e.g. RSRP, RSRQ etc) over larger measurement bandwidth such as over 10 MHz instead of default 1.4 MHz. Similarly the network may prefer to assign wireless devices, e.g. UEs, with larger form factor to be served on a higher frequency band (e.g. above 1 GHz) and wireless devices, e.g. UEs, with smaller form factor on a lower frequency band (e.g. below 1 GHz). In this way the network may ensure better coverage which improves at lower frequency band. The network may use this principle for doing load balancing between different carriers.

Thus, in particular variants, the network node assigns a measurement bandwidth for the wireless device based on the form factor information in step 130. As a particular example, the network node may assign a wider measurement bandwidth if the wireless device has a smaller form factor.

In yet further variants, the network node assigns an operating bandwidth for the wireless device based on the form factor information in step 130. As a particular example, the network node may assign a wider operating bandwidth if the wireless device has a larger form factor.

The network may also select appropriate antenna transmission mode depending upon the form factor of the wireless device. For instance the network may configure the wireless device to operate using 4×2 antenna mode in case the UE supports large form factor. In this way benefit of using higher order antenna mode in terms of achieving higher bit rate can be achieved. The higher order antenna mode (e.g. 4×2) can be avoided for wireless device with smaller form factor. In this way wireless device power consumption can also be reduced; the use of higher order antenna mode results in more power consumption.

In other variants, step 130 comprises performing one or more of the following tasks:

Radio resource preparation: For example, when a cell change occurs, e.g. handover, the network node, i.e. the target eNB in this particular example, may use form factor information received from the source eNB to prepare or proactively determine the expected resources required for serving the wireless device, e.g. an UE, after the cell change. The network node, e.g. radio network node, may also select appropriate physical layer parameters and configuration (e.g. modulation and coding scheme, HARQ parameters etc) depending upon the form factor of the incoming device. For example if the form factor is large then the network node may use less robust schemes, e.g. a less robust coding scheme. If the form factor is smaller, the network node may use more robust parameters to enable better physical layer performance, i.e. robust recovery from errors.

Positioning improvement: In this variant, the network node is a positioning node. The positioning node may use the acquired form factor information to avoid performing critical positioning measurements (e.g. for emergency calls) on carriers at higher frequency (e.g. above 1 GHz) in case the wireless device form factor is small. Instead, the positioning node may request the wireless device, e.g. UE, to perform inter-frequency measurements on a lower frequency (below 1 GHz) for performing positioning measurements, especially when the measurement is critical. In other words, the selection of frequency (e.g. frequency band) for performing measurements may be triggered by, or based on, the wireless device form factor. The positioning node may also use the acquired form factor information for selecting configuration parameters related to a positioning session/measurements (e.g. assistance data sent to UE to assist the positioning measurements). For instance, the positioning node may select a larger bandwidth for doing positioning measurements (e.g. OTDOA RSTD) in case the form factor is small. The positioning node may also use a larger number of time domain resources (e.g. number of positioning sub frames per positioning occasion) for measurements in this case. In this way, the accuracy of the measurement may be improved.

Monitoring of the network performance: The network node, e.g. a centralized node or any radio network node, may use the acquired information (e.g. statistics) for monitoring the network performance Network planning and deployment: The network node, e.g. a centralized node or any radio network node, may use the obtained information for planning, dimensioning, deployment of network nodes, identification of locations to deploy or modify different features such as carrier aggregation, configuration and setting of network parameters such as carrier frequencies, frequency bands, bandwidth selection, measurement bandwidth etc. For example, if a large number of wireless devices operating in the coverage area, or in a part of the network, bear a smaller for factor, then the network node may deploy or configure lower frequencies (e.g. below 1 GHz). In this scenario, the network may also not deploy large number of multiple antennas and thus lower costs. On the other hand, if there is a substantial percentage of wireless devices with large form factors, then higher frequencies as well as a higher order antenna mode can be deployed and ensure better and cost effective performance.

A number of methods for obtaining form factor information, as well as a number of different ways of using the determined from factor e.g. for network operations or network management have been described above. It should be clear that the usage of the form factor information is independent of the way it is obtained. Thus, it is emphasized that in general, any of the disclosed methods for obtaining the form factor information may be combined with any of the methods of using this information by the network node. However, as an exception, a centralized or remote network node such as an O&M node or positioning node may in certain cases not be configured to, or not located close enough to the wireless device to determine the form factor autonomously by measurements. Furthermore, it should be appreciated that if the first network node is not in direct communication with the wireless device, the first network node may obtain the form factor information indirectly via another network node. For instance, a positioning node may obtain form factor information via a base station (e.g. eNB) serving the wireless device.

In an optional step 140, the network node sends the form factor information to a second network node. Optionally, one or more form factor metric indications may be included, as described above. The second network node may store the information for later use, send it on to yet another network node, or the second network node may use the form factor information itself in any of the operations described in connection with step 130. For example, during handover preparations the source network node may transmit form factor information to the target network node. The form factor information may be transmitted in any of the ways described in connection with step 220 below.

In a further optional step 150, the network node obtains updated form factor information. The updated form factor information may be obtained in any of the ways described in connection with step 120 above. Step 150 may be performed regularly with a certain time interval or when triggered by an outside condition, e.g. when the network node detects that the form factor has been modified or may have been modified, for instance by observing a sudden change in reported radio measurements from the wireless device. After performing step 150, step 130 is performed and optionally also step 140.

With reference to the flow chart in FIG. 1, another method in a network node according to some embodiments will now be described. In this method, the network node sends a request for form factor information to a wireless device in step 110. In step 120, the network node receives the form factor information from the wireless device. The network node then uses the form factor in step 130, in any of the ways described in connection with step 130 of the previous embodiment. Optionally, steps 140 and/or 150 may be performed, in a corresponding way as in the previous embodiment.

Thus, with reference to FIG. 1, one particular embodiment comprises the steps 120 and 130. Another particular embodiment comprises the steps 120, 130, 140. Another particular embodiment comprises the steps 120, 130, 140, 150. Another particular embodiment comprises the steps 120, 130, 150. Furthermore, step 110 may be combined with any of these particular embodiments.

With reference to the flow chart in FIG. 1, another method in a network node according to some embodiments will now be described. This embodiment is based on the previous embodiments, but here the network node determines the form factor of the wireless device based on a combination of explicit reporting and autonomous determination. The network node will sometimes be referred to as the "first network node" below.

In step 120 the first network node determines the form factor of the wireless device by a combination of reported form factor, and autonomous determination. Both these methods were described above in connection with previous embodiments. The purpose of combined method is to determine the form factor more accurately by utilizing characteristics of both major mechanisms. This is elaborated below.

The form factor reported by the wireless device to the first network node may be expressed in terms of one of a number of discrete levels, for examples 3 levels (e.g. medium form factor, where the possible levels are small, medium or large form factor) or 4 levels (e.g. small form factor, where the possible levels are small, medium, large, and very large form factor). Assume that the actual form factor of the device lies some where between medium and large assuming there are three levels (small, medium and large). Thus the first network node upon receiving the wireless device form factor may use the principles for autonomous determination described above, in order to determine a more precise value of the form factor. Since the first network node knows the reported form factor, it may determine the form factor (e.g. an exact or at least more accurate value) by varying the reference value between medium and large while keeping the conditions unchanged. When the match is found with the reference value then the actual form factor will correspond to the selected reference value.

The determined form factor may be used by the first network node for performing one or more radio network operations in step 130. The network may use the determined form factor in addition to the measurements, e.g. conducted measurements such as UE measured power, CSI reports etc, for improving the performance of one or more tasks associated with the radio network operation. The objective is thus to improve the network performance while taking into account at least the determined form factor in radio network operation tasks. This step corresponds to step 130 in the previous embodiment; thus, any of the mechanisms disclosed above for using the form factor information apply here as well.

Furthermore, the optional steps 110, 140, and/or 150 may be performed in variants of this embodiment, similarly to what was described for the previous embodiment.

Figure 11:
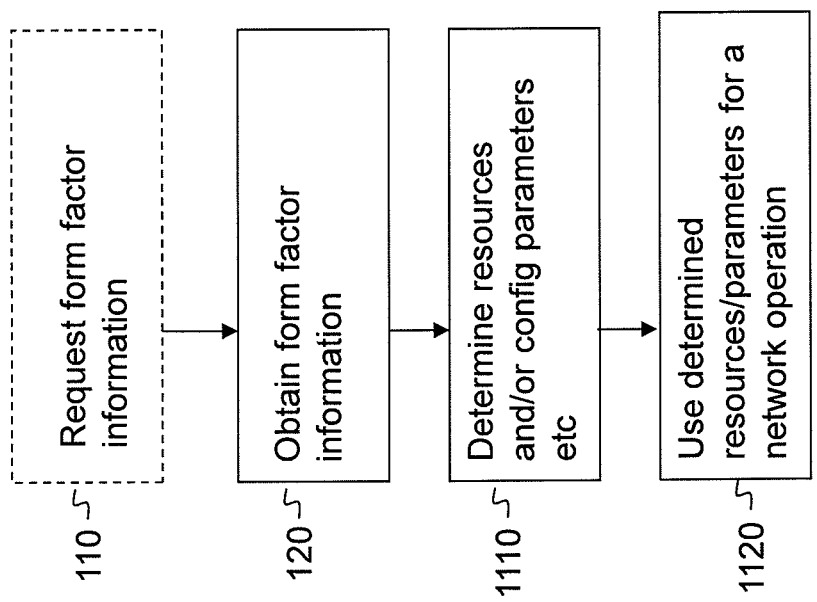
FIG. 11 is a flow chart illustrating a method according to some embodiments.

A method in a network node according to some embodiments will now be described with reference to the flow chart in FIG. 11. This method may be based on any of the methods described in connection with FIG. 1 above. The network node is comprised in a wireless communications network, e.g. an LTE network.

In a step 120, the network node obtains information related to the form factor of a wireless device comprised in the wireless communications network. The information may be obtained in any of the ways described above in connection with FIG. 1, e.g. from measurement results.

In step 1110, the network node determines radio resources and/or appropriate physical layer parameters, and/or configuration parameters for the wireless device based on the obtained information. In particular variants, the network node determines one or more of: transport format, measurement bandwidth, measurement frequency, operating bandwidth, operating frequency, power control target, or radio link quality target for the wireless device.

In step 130, the determined resources and/or parameters are used for a network operation, e.g. radio resource preparation or positioning improvement. This step has also been described in detail in connection with FIG. 1.

In one particular embodiment, the network node determines, in step 1110, an operating frequency for the wireless device based on the form factor information. For example, a higher frequency band or higher-frequency carrier may be assigned if the wireless device has a higher form factor. In step 130, the network node configures the wireless device to use the determined operating frequency.

In another particular embodiment, the network determines, in step 1110, a transport format for the wireless device based on the form factor information. For example, a more robust transport format than indicated by conducted measurement results may be assigned if the wireless device has a smaller form factor or reduced radiated power. In step 130, the network node schedules the wireless device using the determined transport format.

In other particular embodiments, the network node is a target base station, and the determined resources and/or parameters are used for radio resource preparation at handover.

In yet other particular embodiments, the network determines, in step 1110, a measurement bandwidth or measurement frequency for the wireless device based on the form factor information. For example, a wider bandwidth and/or a lower frequency band may be determined if the wireless device has a smaller form factor. In step 130, the network node configures the wireless device to perform measurements over the determined bandwidth.

One or more of the optional steps 110 and 140-150 may also be performed, similarly to what was described above in connection with FIG. 1.

A method in a first network node for providing information relating to the form factor of a wireless device to a second network node will now be described, with reference to FIG. 2.

The first network node (e.g. serving radio network node etc) obtains information about the form factor of the wireless device in step 210. The form factor information may be based on signaled value, autonomously determined value, or a combination thereof as described above. The first network node may even maintain previously obtained form factor information for later use, e.g. in a database. The form factor information may also be maintained by the second network node. For instance, the form factor information may be sent to a centralized node or core network node such as an MME, from which it may later be downloaded by any other network node for use.

The first network node sends the form factor information to a second network node in step 220. The form factor information may comprise a unique identifier for the wireless device, e.g. a subscriber ID such as IMSI or T-IMSI, or an identifier which is unique for the physical wireless device. Thus, the first network node may signal or forward the form factor information for the wireless device to other network nodes over a suitable interface. The other network node may be a radio network node or a node in the core network or a network node outside the core network node or it may be a positioning node.

Examples of other network nodes are:
Neighboring radio network node e.g. controlling RNC, neighboring RNC, Node B, eNode B, BS, relay, donor node etc.
Any configuring node e.g. positioning node such as E-SMLC configuring positioning measurements etc
Core network node e.g. MME, access gateway etc
Any centralized network node e.g. MDT node, SON node, network monitoring and planning node, O&M node, OSS node etc For example in LTE, the eNode B may signal the form factor information to another eNode B over the X2 interface. Similarly, the eNode B may signal this information to positioning node e.g. E-SMLC in LTE over the LPPa protocol. Another example is that of the relay node signaling this information to another relay node (e.g. in multi-hop relay system but also applies to single hop relay system) or to the donor BS e.g. LTE relay node signaling this information to its donor eNode B. Similarly the eNode B in LTE may signal the above mentioned information to the MME over S1. In HSPA the RNC may signal this information to another RNC over Iur interface. The RNC may even signal this information to Node B over Iub interface.

In an optional step 230, the first network node obtains updated form factor information for the wireless device, and sends the updated information to the second network node. For example, this could be done periodically or when the first network node detects that the form factor of the device has been modified, as has been described above.

A method for using form factor information in a second network node according to some embodiments will now be described.

The second network node receives form factor information from a first network node. The first network node may have determined the form factor information by any of the means described above.

The second node then uses the acquired or determined information (i.e. wireless device form factor information or statistics) for one or more of the following tasks:

Radio resource preparation: For example the target eNB may use the received form factor information from the source eNB to prepare or proactively determine the expected resources required for serving the UE or any wireless device after the cell change. The radio network node may also select appropriate physical layer parameters and configuration (e.g. modulation and coding scheme, HARQ parameters etc) depending upon the form factor of the incoming device. For example if the form factor is large then the network may use less robust schemes (e.g. less robust coding scheme). Otherwise the network may use more robust parameters to enable better physical layer performance (i.e. robust recovery from errors).

Positioning improvement: Positioning node may use the acquired information to avoid critical positioning measurements (e.g. or emergency calls) on carriers at higher frequency (e.g. above 1 GHz) in case the wireless device form factor is small. Instead the positioning node may request the UE or target device to perform inter-frequency measurements on lower frequency (below 1 GHz) for performing positioning measurements especially when criticality is associated. This means selection of frequency (e.g. frequency band) for performing measurements is triggered by the wireless device form factor. The positioning node may also use the acquired information for selecting configuration parameters related to positioning session/measurements (e.g. assistance data sent to UE to assist the positioning measurements). For instance the positioning node may select larger bandwidth for doing positioning measurements (e.g. OTDOA RSTD) in case the form factor is small. The positioning node may also use larger number of time domain resources (e.g. positioning sub frames per positioning occasion) for measurements in this case. In this way the accuracy of the measurement can be improved.

Monitoring of the network performance: The centralized or any radio network node may use the acquired information (e.g. statistics) for monitoring the network performance network and observation.

Network planning and deployment: The centralized or any radio network node may use the obtained information for planning, dimensioning, deployment of network nodes, identification of location to deploy or modify different features such as carrier aggregation, configuration and setting of network parameters such as carrier frequencies, frequency bands, bandwidth selection, measurement bandwidth etc. For example if there are large number of wireless devices operating in the coverage area or in part of network bear smaller for factor then the network can deploy or configure lower frequencies (e.g. below 1 GHz). In this scenario the network may also not deploy large number of multiple antennas and thus save cost. But if there is substantial percentage of wireless devices with large form factors then higher frequencies as well as higher order antenna mode can be deployed and ensure better and cost effective performance.

Some example implementations of the embodiments illustrated above will now be described.

Figure 10:
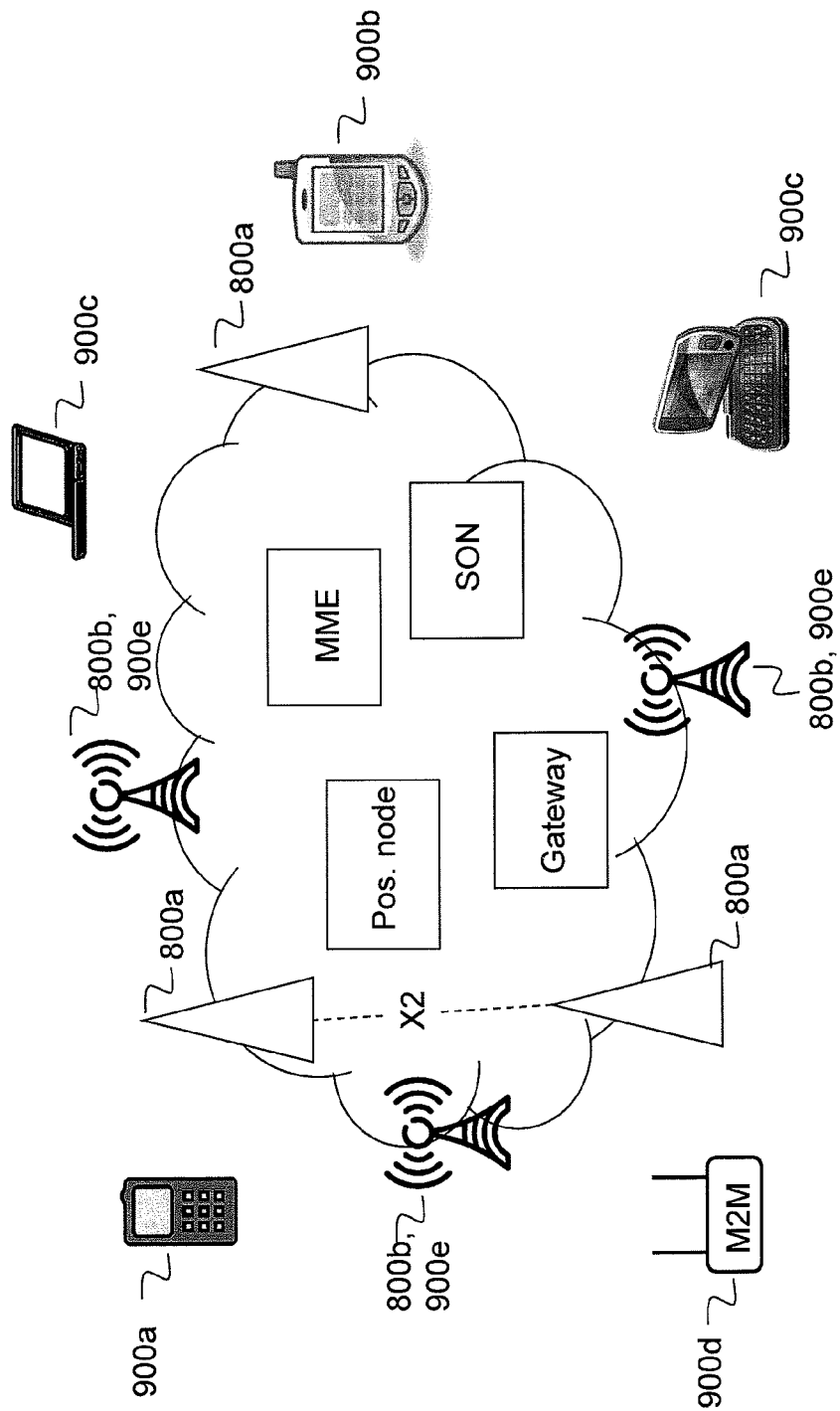
FIG. 10 is a schematic diagram illustrating a wireless communications network.

Although the described solutions may be implemented in any appropriate type of telecommunication system supporting any suitable communication standards and using any suitable components, particular embodiments of the described solutions may be implemented in an LTE network, such as that illustrated in FIG. 10. As shown in FIG. 10, the example network may include one or more instances of wireless devices 900, e.g. mobile terminals 900*a-c*, laptops 900*c*, M2M-capable devices 900*d*, or home base station 900*e*, and one or more network nodes capable of communicating with these wireless devices, where examples of network nodes include eNBs 800*a*, home base stations 800*b*, positioning node (eSMLC), MME, SON node, and Gateway. Thus, some network nodes such as home base stations 800*b*, 900*e* may in some scenarios be considered as wireless devices within the context of this disclosure. This is in particular true for small network devices where the form factor may significantly affect radio performance.

The example network may further include any additional elements suitable to support communication between wireless devices or between a wireless device and another communication device (such as a landline telephone). Although the illustrated wireless devices may represent communication devices that include any suitable combination of hardware and/or software, these wireless devices may, in particular embodiments, represent devices such as the example wireless device 900 illustrated in greater detail by FIG. 9. Similarly, although the illustrated network nodes may represent network nodes that include any suitable combination of hardware and/or software, these network nodes may, in particular embodiments, represent devices such as the example network node 800 illustrated in greater detail by FIG. 8.

Figure 9:
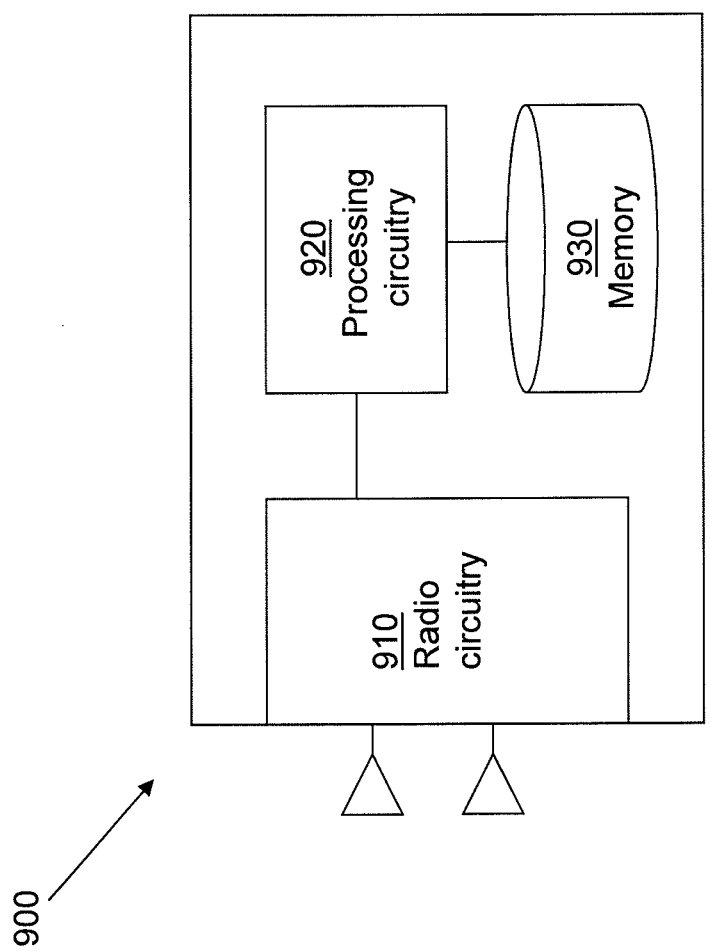
FIG. 9 is a schematic block diagram illustrating a wireless device according to some embodiments.

As shown in FIG. 9, the example wireless device 900 includes processing circuitry 920, a memory 930, radio circuitry 910, and at least one antenna. The radio circuitry may comprise RF circuitry and baseband processing circuitry (not shown). In particular embodiments, some or all of the functionality described above as being provided by mobile communication devices or other forms of wireless device may be provided by the processing circuitry 920 executing instructions stored on a computer-readable medium, such as the memory 930 shown in FIG. 9. Alternative embodiments of the wireless device 900 may include additional components beyond those shown in FIG. 9 that may be responsible for providing certain aspects of the wireless device's functionality, including any of the functionality described above and/or any functionality necessary to support the solution described above.

Figure 8:
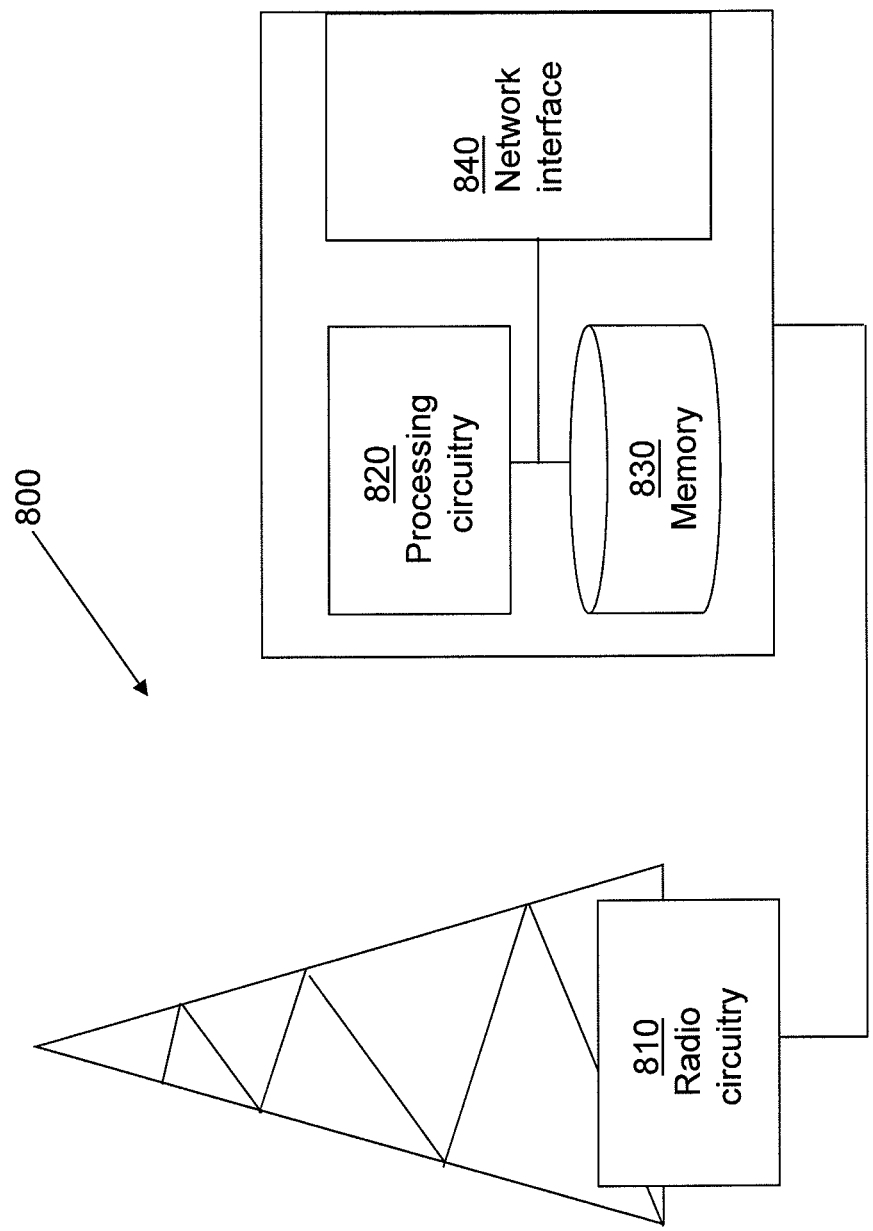
FIG. 8 is a schematic block diagram illustrating a network node according to some embodiments.

As shown in FIG. 8, the example network node 800 includes processing circuitry 820, a memory 830, radio circuitry 810, and at least one antenna. The processing circuitry 820 may comprise RF circuitry and baseband processing circuitry (not shown). In particular embodiments, some or all of the functionality described above as being provided by a mobile base station, a base station controller, a relay node, a NodeB, an enhanced NodeB, and/or any other type of mobile communications node may be provided by the processing circuitry 820 executing instructions stored on a computer-readable medium, such as the memory 830 shown in FIG. 8. Alternative embodiments of the network node 800 may include additional components responsible for providing additional functionality, including any of the functionality identified above and/or any functionality necessary to support the solution described above.

Some embodiments provide a method in a network node. The network node obtains information relating to the form factor of a wireless device, for example a mobile terminal or a home base station. The network node then uses the form factor information for radio node operations such as scheduling or power control, or for network planning or management.

Particular embodiments provide a network node comprising processing circuitry, radio circuitry, and a memory. The processing circuitry is configured to obtain information relating to the form factor of a wireless device. In some variants, the processing circuitry obtains the information from the memory, whereas in other variants, the processing circuitry obtains the information via the radio circuitry. The processing circuitry is further configured to use the form factor information for radio node operations such as scheduling or power control, or for network planning or management. In some variants, the processing circuitry is configured to perform the radio node operations via the radio circuitry.

It should be noted that although terminology from 3GPP LTE has been used in this disclosure to exemplify the invention, this should not be seen as limiting the scope of the invention to only the aforementioned system. Other wireless systems, including WCDMA, WiMax, UMB and GSM, may also benefit from exploiting the ideas covered within this disclosure.

When using the word "comprise" or "comprising" it shall be interpreted as non-limiting, i.e. meaning "consist at least of".

The present invention is not limited to the above-describe preferred embodiments. Various alternatives, modifications and equivalents may be used. Therefore, the above embodiments should not be taken as limiting the scope of the invention.

The invention claimed is:

1. A method executed in a network node in a wireless communications network, the method comprising:
   resolving a physical form factor of a wireless device in the wireless communications network from obtained information;
   determining for the wireless device and based on the physical form factor, at least one of:
     radio resources;
     appropriate physical layer parameters;
     configuration parameters;
   using the determined resources and/or parameters for a network operation.

2. The method of claim 1, wherein the determining further comprises determining one or more of the following for the wireless device based on the physical form factor:
   transport format;
   measurement bandwidth;
   measurement frequency;
   operating bandwidth;
   operating frequency;
   power control target;
   radio link quality target.

3. The method of claim 2, wherein the determining further comprises:
   assigning the wireless device to a higher frequency band or higher-frequency carrier based on the wireless device having a larger physical form factor;
   assigning the wireless device to a lower frequency band or lower-frequency carrier based on the wireless device having a smaller physical form factor.

4. The method of claim 2, wherein the determining further comprises allocating resources with a more robust transport format than indicated by conducted measurement results based on the wireless device having a smaller physical form factor or reduced radiated power.

5. The method of claim 2, wherein the determining further comprises configuring the wireless device to perform measurements over a wider bandwidth and/or in a lower frequency band based on the wireless device having a small physical form factor.

6. The method of claim 5:
   wherein the network node is a positioning node;
   wherein the measurements are critical positioning measurements.

7. The method of claim 1:
   wherein the network node is a target base station;
   wherein the using comprises using the determined resources and/or parameters for radio resource preparation at handover to the target base station.

8. The method of claim 1, further comprising:
   obtaining updated physical form factor information for the wireless device;
   using the updated information for a network operation.

9. The method of claim 1, wherein resolving the physical form factor from obtained information comprises:
   obtaining measurement results for the wireless device, radio resource usage for the wireless device, or an achieved bit rate for the wireless device under certain conditions;
   determining a physical form factor metric for the device based on comparing the measurement results, radio resource usage, or achieved bit rate with a reference value applicable under the same or similar conditions.

10. The method of claim 9, wherein the conditions comprise one or more of:
    radio environment;
    speed of the wireless device;
    carrier frequency;
    antenna configuration;
    location of the wireless device;
    cell load;
    interference;
    traffic characteristics;
    amount of resources assigned.

11. The method of claim 1, wherein resolving the physical form factor from obtained information comprises receiving the information from the wireless device, or from another network node.

12. The method of claim 1, wherein the information from which the network node resolves the physical form factor reflects one or more of:
- morphological characteristics;
- antenna correlation characteristics;
- antenna separation characteristics;
- orientation of the wireless device;
- material conductivity;
- an indication of interaction of the wireless device with an auxiliary device.

13. The method of claim 1, wherein the information from which the network node resolves the physical form factor comprises an indication of which metric or metrics the physical form factor information relates to.

14. A network node, comprising:
- radio circuitry;
- processing circuitry operatively connected to the radio circuitry;
- memory operatively connected to the processing circuitry;
- wherein the processing circuitry is configured to:
  - resolve a physical form factor of a wireless device from obtained information;
  - determine, based on the physical form factor, at least one of:
    - expected resources required for serving the wireless device;
    - appropriate physical layer parameters for the wireless device;
    - configuration parameters for the wireless device;
  - use the determined parameters and/or expected resources for a network operation.

15. The network node of claim 14, wherein the network node is a base station, a radio network controller, a mobility management entity, or a positioning node.

* * * * *

UNITED STATES PATENT AND TRADEMARK OFFICE
CERTIFICATE OF CORRECTION

PATENT NO.        : 9,094,845 B2  
APPLICATION NO.   : 13/702719  
DATED             : July 28, 2015  
INVENTOR(S)       : Kazmi et al.

Page 1 of 1

It is certified that error appears in the above-identified patent and that said Letters Patent is hereby corrected as shown below:

On the title page

In Column 1, delete "(71) Applicants: Muhammad Ali Kazmi, Bromma (SE); Torbjörn Elfström, Fjärås (SE)".

In Item (72), in Column 1, delete Item "(72)" and insert Item -- (75) --, therefor.

In the specification

In Column 13, Line 25, delete "station. or" and insert -- station or --, therefor.

In Column 14, Line 26, delete "device. may" and insert -- device may --, therefor.

In Column 18, Line 45, delete "margin. then" and insert -- margin then --, therefor.

Signed and Sealed this  
Fifth Day of July, 2016

Michelle K. Lee  
*Director of the United States Patent and Trademark Office*